US012714988B2

(12) United States Patent
Hodgkins et al.

(10) Patent No.: US 12,714,988 B2
(45) Date of Patent: Aug. 25, 2026

(54) MODIFIED ZEOLITES THAT INCLUDE AMINE FUNCTIONALITIES AND METHODS FOR MAKING SUCH

(71) Applicants: Saudi Arabian Oil Company, Dhahran (SA); King Abdullah University of Science and Technology, Thuwal (SA)

(72) Inventors: Robert Peter Hodgkins, Dhahran (SA); Omer Refa Koseoglu, Dhahran (SA); Kuo-Wei Huang, Thuwal (SA); Magnus Rueping, Thuwal (SA); Anissa Bendjeriou Sedjerari, Thuwal (SA); Rajesh Kumar Parsapur, Thuwal (SA); Swechchha Pandey, Thuwal (SA)

(73) Assignees: Saudi Arabian Oil Company, Dhahran (SA); King Abdullah University of Science and Technology, Thuwal (SA)

( * ) Notice: Subject to any disclaimer, the term of this patent is extended or adjusted under 35 U.S.C. 154(b) by 156 days.

(21) Appl. No.: 18/470,076

(22) Filed: Sep. 19, 2023

(65) Prior Publication Data

US 2025/0091038 A1 Mar. 20, 2025

(51) Int. Cl.
*B01J 35/64* (2024.01)
*B01J 29/04* (2006.01)
(Continued)

(52) U.S. Cl.
CPC ........... *B01J 29/084* (2013.01); *B01J 29/041* (2013.01); *B01J 35/615* (2024.01); *B01J 35/617* (2024.01);
(Continued)

(58) Field of Classification Search
CPC ...... B01J 35/643; B01J 29/041; B01J 29/084; C01B 39/20
See application file for complete search history.

(56) References Cited

U.S. PATENT DOCUMENTS 6,051,745 A * 4/2000 Wu .......................... B01J 29/85 502/232
7,678,955 B2 3/2010 Martens et al.
(Continued)

FOREIGN PATENT DOCUMENTS

CA 2563822 A1 * 3/2006 .......... B01J 31/1625
EP 2025645 A1 2/2009

OTHER PUBLICATIONS

Filip D. P. Mees et al., Controlled Reduction of the Acid Site Density of SAPO-34 Molecular Sieve by Means of Silanation and Disilanation, 2003, The Journal of Physical Chemistry B 107 (14), 3161-3167 (Year: 2003).*
(Continued)

*Primary Examiner* — Ellen M Mcavoy
*Assistant Examiner* — Ming Cheung Po
(74) *Attorney, Agent, or Firm* — Dinsmore & Shohl, LLP.

(57) ABSTRACT

Modified zeolite may include a microporous framework including a plurality of micropores having diameters of less than or equal to 2 nm, wherein the microporous framework includes at least silicon atoms and oxygen atoms; a plurality of mesopores having diameters of greater than 2 nm and less than or equal to 50 nm, wherein the plurality of mesopores are ordered with cubic symmetry. The modified zeolite also includes: isolated terminal primary amine functionalities bonded to silicon atoms of the microporous framework; or silazane functionalities, wherein the nitrogen atom of the silazane bridges two silicon atoms of the microporous framework; or both.

19 Claims, 15 Drawing Sheets

(51) Int. Cl.

| | |
|---|---|
| ***B01J 29/08*** | (2006.01) |
| ***B01J 35/61*** | (2024.01) |
| ***B01J 35/63*** | (2024.01) |
| ***C01B 39/02*** | (2006.01) |
| ***C01B 39/20*** | (2006.01) |
| ***C01B 39/24*** | (2006.01) |

(52) U.S. Cl.

CPC .......... *B01J 35/618* (2024.01); *B01J 35/633* (2024.01); *B01J 35/635* (2024.01); *B01J 35/638* (2024.01); *B01J 35/643* (2024.01); *B01J 35/647* (2024.01); *B01J 35/651* (2024.01); *C01B 39/026* (2013.01); *C01B 39/24* (2013.01); *B01J 2229/34* (2013.01); *C01P 2002/01* (2013.01); *C01P 2002/72* (2013.01); *C01P 2002/82* (2013.01); *C01P 2002/86* (2013.01)

(56) References Cited

U.S. PATENT DOCUMENTS

| | | | |
|---|---|---|---|
| 10,173,903 | B2 | 1/2019 | Rimer et al. |
| 10,196,465 | B2 | 2/2019 | Han et al. |
| 10,265,686 | B2 | 4/2019 | Kegnaes |
| 10,266,416 | B2 | 4/2019 | Kegnaes et al. |
| 10,662,070 | B2 | 5/2020 | Rimer et al. |
| 10,759,881 | B2 | 9/2020 | Han et al. |
| 10,988,556 | B2 | 4/2021 | Han et al. |
| 11,066,491 | B2 | 7/2021 | Han et al. |
| 11,123,713 | B2 | 9/2021 | Berman et al. |
| 11,591,229 | B2 | 2/2023 | Hodgkins et al. |
| 12,145,854 | B2 * | 11/2024 | Hodgkins ................ B01J 29/40 |
| 2010/0196262 | A1 * | 8/2010 | Xu ........................ B01J 29/041 423/700 |
| 2015/0360964 | A1 | 12/2015 | Rimer et al. |
| 2016/0137516 | A1 | 5/2016 | Kegnaes et al. |
| 2017/0114157 | A1 | 4/2017 | Han et al. |
| 2018/0327523 | A1 | 11/2018 | Han et al. |
| 2019/0040159 | A1 | 2/2019 | Han et al. |
| 2019/0144291 | A1 | 5/2019 | Rimer et al. |
| 2020/0347157 | A1 | 11/2020 | Han et al. |
| 2020/0347158 | A1 | 11/2020 | Han et al. |
| 2022/0332592 | A1 | 10/2022 | Hodgkins et al. |

OTHER PUBLICATIONS

Katabathini Narasimharao, Martin Hartmann, Helwig H. Thiel , Stefan Ernst, Novel solid basic catalysts by nitridation of zeolite beta at low temperature, Mar. 2006, Microporous and Mesoporous Materials, vol. 90, Issues 1-3, 20 pp. 377-383 (Year: 2006).*

Application as filed pertaining to U.S. Appl. No. 17/857,447 dated Jul. 5, 2022, 82 pages.

Application as filed pertaining to U.S. Appl. No. 17/857,671 dated Jul. 5, 2022, 91 pages.

Notification of Transmittal of the International Search Report and the Written Opinion of the International Searching Authority, or the Declaration dated Jan. 7, 2025 pertaining to International application No. PCT/US2024/047024 filed Sep. 17, 2024, pp. 1-12.

* cited by examiner

MODIFIED ZEOLITES THAT INCLUDE AMINE FUNCTIONALITIES AND METHODS FOR MAKING SUCH

TECHNICAL FIELD

The present disclosure generally relates to porous materials and, more specifically, to zeolites.

BACKGROUND

Materials that include pores, such as zeolites, may be utilized in many petrochemical industrial applications. For example, such materials may be utilized as catalysts in a number of reactions that convert hydrocarbons or other reactants from feed chemicals to product chemicals. Zeolites may be characterized by a microporous structure framework type. Various types of zeolites have been identified over the past several decades, where zeolite types are generally described by framework types, and where specific zeolitic materials may be more specifically identified by various names such as ZSM-5 or Beta or USY.

BRIEF SUMMARY

The present disclosure is directed to modified zeolites that include amine functionalities and a plurality of mesopores ordered with cubic symmetry. In some embodiments, the modified zeolites may include primary and/or secondary amine functionalization. Specifically, the modified zeolites may include one or both of isolated terminal primary amine functionalities bonded to silicon atoms of the microporous framework, or silazane functionalities wherein the nitrogen atom of the silazane bridges two silicon atoms of the microporous framework. Such modified zeolites, according to one or more embodiments presently disclosed, may have enhanced or differentiated catalytic functionality as compared with conventional zeolites.

According to one or more embodiments of the present disclosure, a modified zeolite comprises a microporous framework comprising a plurality of micropores having diameters of less than or equal to 2 nm, wherein the microporous framework comprises at least silicon atoms and oxygen atoms; and a plurality of mesopores having diameters of greater than 2 nm and less than or equal to 50 nm, wherein the plurality of mesopores are ordered with cubic symmetry. The modified zeolite also comprises: isolated terminal primary amine functionalities bonded to silicon atoms of the microporous framework; or silazane functionalities wherein the nitrogen atom of the silazane bridges two silicon atoms of the microporous framework; or both.

According to one or more embodiments of the present disclosure, a method for processing a hydrocarbon feedstock comprises contacting the hydrocarbon feedstock with a modified zeolite to form a product, wherein the modified zeolite comprises: a microporous framework comprising a plurality of micropores having diameters of less than or equal to 2 nm, wherein the microporous framework comprises at least silicon atoms and oxygen atoms; and a plurality of mesopores having diameters of greater than 2 nm and less than or equal to 50 nm, wherein the plurality of mesopores are ordered with cubic symmetry. The modified zeolite comprises: isolated terminal primary amine functionalities bonded to silicon atoms of the microporous framework; or silazane functionalities wherein the nitrogen atom of the silazane bridges two silicon atoms of the microporous framework; or both.

According to one or more embodiments of the present disclosure, a method of making a modified zeolite comprises contacting a dehydroxylated zeolite with ammonia, wherein the dehydroxylated zeolite comprises: a microporous framework comprising a plurality of micropores having diameters of less than or equal to 2 nm, wherein the microporous framework comprises at least silicon atoms and oxygen atoms; a plurality of mesopores having diameters of greater than 2 nm and less than or equal to 50 nm, wherein the plurality of mesopores are ordered with cubic symmetry; and isolated terminal silanol functionalities comprising hydroxyl groups bonded to silicon atoms of the microporous framework; wherein contacting the dehydroxylated zeolite with the ammonia forms the modified zeolite.

Additional features and advantages of the described embodiments will be set forth in the detailed description which follows, and in part will be readily apparent to those skilled in the art from that description or recognized by practicing the described embodiments, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1A:
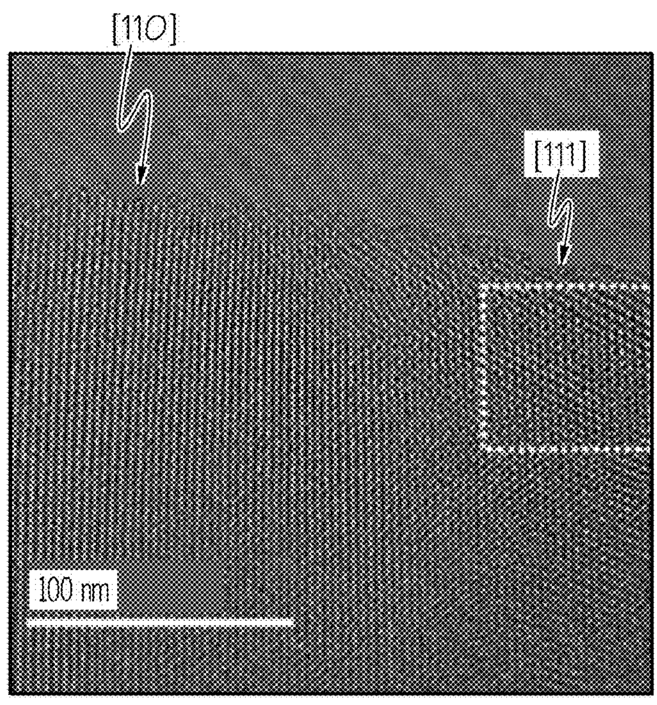
FIG. 1A depicts a transmission electron microscopy (TEM) micrograph of the zeolite comprising mesopores ordered with cubic symmetry of Example 1.

The present disclosure is directed to zeolites which are modified by amine functionalities. As described herein, "modified zeolites" refer to zeolites that include amine functionalities. According to one or more embodiments, the amine functionalities may include isolated terminal primary amine functionalities and/or silazane functionalities, as described herein.

According to embodiments disclosed herein, the modified zeolites may be formed by a process that includes dehydroxylating an initial zeolite and forming a modified zeolite from the dehydroxylated zeolite. While embodiments of modified zeolites prepared by this procedure are disclosed herein, embodiments of the present disclosure should not be considered to be limited to zeolites made by such a process. Embodiments of zeolites modified with amine functionalities are depicted in Chemical Structure #1. For example, Chemical Structure #1 includes both isolated terminal primary amine functionalities bonded to silicon atoms of the microporous framework, and silazane functionalities wherein the nitrogen atom of the silazane bridges two silicon atoms of the microporous framework. In some embodiments, only one of these moieties may be present without the other.

Chemical Structure #1

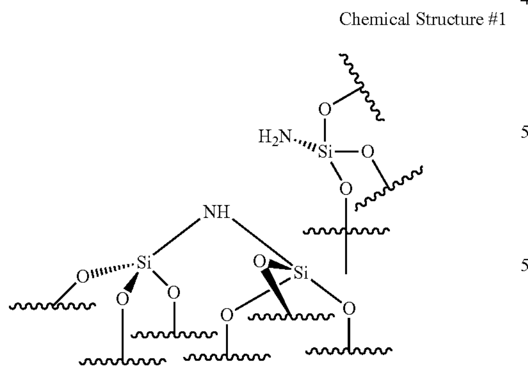

Without intending to be bound by theory, the modified zeolites comprising mesopores ordered with cubic symmetry and comprising amine functionalities, such as isolated terminal primary amine functionalities and/or silazane functionalities may have enhanced or differentiated catalytic functionality as compared with conventional zeolites. Without intending to be bound by theory, the acidity of the modified zeolite may be tuned by modification with amine functionalities to adjust the catalytic properties of the modified zeolite.

Without intending to be bound by theory, the cubic ordering of the mesopores may result in mesopores being interconnected throughout the modified zeolite in an interconnected, ordered mesoporous system. Interconnected mesopores may make it easier for large reactant molecules to diffuse into the modified zeolite and react. Additionally, cubic ordering of mesopores may impart size and shape selectivity for reactants and products to the modified zeolite because molecules of different sizes and shapes may have different efficiencies for diffusing through the cubic ordered mesopores of the modified zeolite. Furthermore, cubic ordering of mesopores may improve the accessibility of the amine functionalities in the modified zeolite.

As presently described, "initial" zeolites may be supplied or produced, as is presently disclosed. According to one or more embodiments described herein, initial zeolites comprise a plurality of mesopores that are ordered with cubic symmetry. As described herein, the characterization of the structure and material of the zeolite may equally apply to the initial zeolite as well as the dehydroxylated zeolite and/or modified zeolite. In one or more embodiments, the structure and material composition of the initial zeolite does not substantially change through the dehydroxylation steps, and/or amine functionalization steps (aside from the introduction of the described functionalities formed by the dehydroxylation and amine functionalization steps). For example, the framework type and general material constituents of the framework may be substantially the same in the initial zeolite and the modified zeolite aside from the addition of the amine functionalities, such as isolated terminal primary amine functionalities and/or silazane functionalities. Likewise, mesoporosity of the initial zeolite may be carried into the modified zeolite. Accordingly, when a "zeolite" is described herein with respect to its structural characterization, the description may refer to the initial zeolite, the dehydroxylated zeolite, and/or the modified zeolite.

As used throughout this disclosure, "zeolites" may refer to micropore-containing inorganic materials with regular intra-crystalline cavities and channels of molecular dimension. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of less than or equal to 2 nm and greater than or equal to 0.1 nm, and mesopores refer to pores in a structure that have a diameter of greater than 2 nm and less than or equal to 50 nm. Unless otherwise described herein, the "pore size" of a material refers to the average pore size, but materials may additionally include mesopores having a particular size that is not identical to the average pore size and thus contain a distribution of pore sizes.

Generally, zeolites may be characterized by a framework type, which defines their microporous structure. The zeolites described presently, in one or more embodiments, are not particularly limited by framework type. Framework types are described in, for example, "Atlas of Zeolite Framework Types" by Ch. Baerlocher et al., Fifth Revised Edition, 2001, which is incorporated by reference herein.

According to one or more embodiments, the zeolites described herein may include at least silicon atoms and oxygen atoms. In some embodiments, the microporous framework may include substantially only silicon and oxygen atoms (e.g., silica material). However, in additional embodiments, the zeolites may include other atoms, such as aluminum. Such zeolites may be aluminosilicate zeolites. In additional embodiments, the microporous framework may include titanium atoms, and such zeolites may be titanosilicate zeolites.

In one or more embodiments, the zeolite may comprise an aluminosilicate microstructure. The zeolite may comprise at least 99 wt. % of the combination of silicon atoms, oxygen atoms, and aluminum atoms. The molar ratio of Si/Al may be from 1.5 to 10,000. For example, without limitation, the molar ratio of Si/Al may be from 1.5 to 10,000, from 1.5 to 5,000, from 1.5 to 2,000, from 1.5 to 1,000, from 1.5 to 800, from 1.5 to 600, from 1.5 to 400, from 1.5 to 200, from 1.5 to 100, from 5 to 10,000, from 5 to 5,000, from 5 to 2,000, from 5 to 1,000, from 5 to 800, from 5 to 600, from 5 to 400, from 5 to 200, from 5 to 100, 10 to 10,000, from 10 to 5,000, from 10 to 2,000, from 10 to 1,000, from 10 to 800, from 10 to 600, from 10 to 400, from 10 to 200, from 10 to 100, 50 to 10,000, from 50 to 5,000, from 50 to 2,000, from 50 to 1,000, from 50 to 800, from 50 to 600, from 50 to 400, from 50 to 200, or from 50 to 100, or any combination of these ranges.

In embodiments, the zeolites may comprise microstructures (which include micropores) characterized by, among others as *BEA framework type zeolites (such as, but not limited to, zeolite Beta), FAU framework type zeolites (such as, but not limited to, zeolite Y or ultra-stable zeolite Y), MOR framework type zeolites, MFI framework type zeolite (such as, but not limited to, ZSM-5 or Silicalite-1), CHA framework type zeolite (such as, but not limited to chabazite zeolite), LTL framework type zeolite (such as but not limited to zeolite L), LTA framework zeolite (such as but not limited to zeolite A), AEI framework type zeolite, or MWW framework type zeolite (such as but not limited to MCM-22). It should be understood that *BEA, MFI, MOR, FAU, CHA, LTL, LTA, AEI, and MWW refer to zeolite framework types as identified by their respective three letter codes established by the International Zeolite Association (IZA). Other framework types are contemplated in the presently disclosed embodiments.

In one or more embodiments, the zeolite may comprise an FAU framework type zeolite, such as zeolite Y or ultra-stable zeolite Y (USY). As used herein, "zeolite Y" and "USY" refer to a zeolite having a FAU framework type according to the IZA zeolite nomenclature and consisting majorly of silica and alumina, as would be understood by one skilled in the art. In one or more embodiments, USY may be prepared from zeolite Y by steaming zeolite Y at temperatures above 500° C. The molar ratio of silica to alumina may be at least 3. For example, the molar ratio of silica to alumina in the zeolite Y may be at least 5, at least 12, at least 30, or even at least 200, such as from 5 to 200, from 12 to 200, or from about 15 to about 200. The unit cell size of the zeolite Y may be from about 24 Angstrom to about 25 Angstrom, such as 24.56 Angstrom.

Along with micropores, which may generally define the framework type of the zeolite, the zeolites may also comprise mesopores. As used herein, a "mesoporous zeolite" refers to a zeolite which includes mesopores, and may have an average mesopore pore size of from 2 to 50 nm. The presently disclosed mesoporous zeolites may have an average mesopore pore size of greater than 2 nm, such as from 4 nm to 16 nm, from 6 nm to 14 nm, from 8 nm to 12 nm, or from 9 nm to 11 nm. In some embodiments, the majority of the mesopores may be greater than 8 nm, greater than 9 nm, or even greater than 10 nm. The mesopores of the mesoporous zeolites described may range from 2 nm to 40 nm, and the median pore size may be from 4 to 12 nm. The mesoporous zeolites described may be generally silica-containing materials, such as aluminosilicates, pure silicates, or titanosilicates.

The mesoporous zeolites described in the present disclosure may have enhanced catalytic activity as compared to non-mesoporous zeolites. Without being bound by theory, it is believed that the microporous structures provide for the majority of the catalytic functionality of the mesoporous zeolites described. The mesoporosity may additionally allow for greater catalytic functionality because more micropores are available for contact with the reactant in a catalytic reaction. The mesopores generally allow for better access to microporous catalytic sites on the mesoporous zeolite, especially when reactant molecules are relatively large. For example, larger molecules may be able to diffuse into the mesopores to contact additional catalytic microporous sites.

In one or more embodiments, the mesoporous zeolites may have a surface area of from 200 $m^2/g$ to 1500 $m^2/g$, from 400 $m^2/g$ to 1500 $m^2/g$, from 600 $m^2/g$ to 1500, from 800 $m^2/g$ to 1500 $m^2/g$, from 1000 $m^2/g$ to 1500, from 1200 $m^2/g$ to 1500 $m^2/g$, from 1400 $m^2/g$ to 1500 $m^2/g$, from 200 $m^2/g$ to 1300 $m^2/g$, from 200 $m^2/g$ to 1100 $m^2/g$, from 200 $m^2/g$ to 900 $m^2/g$, from 200 $m^2/g$ to 700 $m^2/g$, from 200 $m^2/g$ to 500 $m^2/g$, from 200 $m^2/g$ to 300 $m^2/g$ or any combination of ranges formed from these endpoints. In one or more other embodiments, the mesoporous zeolites may have pore volume from 0.01 $cm^3/g$ to 1.5 $cm^3/g$, 0.05 $cm^3/g$ to 1.5 $cm^3/g$, from 0.1 $cm^3/g$ to 1.5 $cm^3/g$, from 0.3 $cm^3/g$ to 1.5 $cm^3/g$, from 0.5 $cm^3/g$ to 1.5 $cm^3/g$, from 0.7 $cm^3/g$ to 1.5 $cm^3/g$, from 0.9 $cm^3/g$ to 1.5 $cm^3/g$, from 1.1 $cm^3/g$ to 1.5 $cm^3/g$, from 1.3 $cm^3/g$ to 1.5 $cm^3/g$, 0.01 $cm^3/g$ to 1.4 $cm^3/g$, 0.01 $cm^3/g$ to 1.2 $cm^3/g$, 0.01 $cm^3/g$ to 1.0 $cm^3/g$, 0.01 $cm^3/g$ to 0.8 $cm^3/g$, 0.01 $cm^3/g$ to 0.6 $cm^3/g$, 0.01 $cm^3/g$ to 0.4 $cm^3/g$, 0.01 $cm^3/g$ to 0.2 $cm^3/g$, 0.01 $cm^3/g$ to 0.1 $cm^3/g$, 0.01 $cm^3/g$ to 0.05 $cm^3/g$, or any combination of ranges formed from these endpoints. In further embodiments, the portion of the surface area contributed by mesopores may be greater than or equal to 20%, greater than or equal to 25%, greater than or equal to 30%, greater than or equal to 35%, greater than or equal to 40%, greater than or equal to 45%, greater than or equal to 50%, greater than or equal to 55%, greater than or equal to 60%, or even greater than or equal to 65%, such as between 20% and 70% of total surface area. In additional embodiments, the portion of the pore volume contributed by mesopores may be greater than or equal to 20%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, or even greater than or equal to 75%, such as between 20% and 80% of total pore volume. Without intending to be bound by theory, when mesopores dominate the overall porosity of the modified zeolite as a percentage of the total porosity, it may be easier for large reactant molecules to diffuse into the modified zeolite and react. Surface area, average pore size, and pore volume distribution may be measured by $N_2$ adsorption isotherms performed at 77 Kelvin (K) (such as with a Micrometrics ASAP 2020 system). As would be understood by those skilled in the art, Brunauer-Emmett-Teller (BET) analysis methods may be utilized.

In one or more embodiments, mesoporous zeolites comprise a plurality of mesopores that are ordered with cubic symmetry. In one or more embodiments, the mesopores may be ordered with cubic symmetry having an Ia-3d, Fm-3m, Pm-3n, Pn-3m, Im-3m, or Fd-3m space group. As described herein, space groups describe combinations of the 32 crystallographic point groups with the 14 Bravais Lattices taking into account symmetries of reflection, rotation and improper rotation, screw axis symmetry, and glide plane symmetry. There are 230 space groups describing possible symmetries. In one or more embodiments, the mesoporous zeolite may comprise mesopores ordered with cubic symmetry having an Ia-3d space group. In one or more embodiments, the mesoporous zeolite may comprise mesopores ordered with cubic symmetry having a Fm-3m space group. In one or more embodiments, the mesoporous zeolite may comprise mesopores ordered with cubic symmetry having a Fd-3m space group. Without intending to be bound by theory, the mesopores ordered with cubic symmetry may allow for improved diffusion of reactants to the active sites of the modified zeolite and improved diffusion of products away from the active sites. The cubic ordering of the mesopores may result in mesopores being interconnected throughout the modified zeolite in an interconnected, ordered mesoporous system. Interconnected mesopores may make it easier for large reactant molecules to diffuse into the modified zeolite and react. Additionally, cubic ordering of mesopores may impart size and shape selectivity for reactants and products to the modified zeolite because molecules of different sizes and shapes may have different efficiencies for diffusing through the cubic ordered mesopores of the modified zeolite. Furthermore, the inclusion of mesopores ordered with cubic symmetry may provide additional accessibility for organometallic moieties to graft to the zeolite at a greater loading.

The presence of mesopores ordered with cubic symmetry in a mesoporous zeolite may be determined by the presence of secondary peaks in a low angle X-ray diffraction (XRD) pattern and/or by observing the cubic symmetry by microscopy. Cubic symmetry of the mesopores may be identified by transmission electron microscopy (TEM) using selected area electron diffraction (SAED) patterns and fast Fourier transform (FFT) patterns. Additionally, mesopore symmetry may be observed by analyzing the mesopore arrangement from multiple orientations, as various types of mesopore symmetry may have distinctive pore-arrangement patterns in one or multiple orientations. In one or more embodiments, mesopores ordered with cubic symmetry having an Ia-3d space group may also be observable by microscopy viewing an electron beam down a [311], [111], or [110] zone axis. In one or more embodiments, a mesoporous zeolite comprising mesopores ordered with cubic symmetry having an Fm-3m space group may be observable by microscopy viewing an electron beam down a [001] or [110] zone axis. In one or more embodiments, a mesoporous zeolite comprising mesopores ordered with cubic symmetry having an Fd-3m space group may be observable by microscopy viewing an electron beam down a [100], [110], [111], or [211] zone axis.

Without intending to be bound by theory, XRD peaks for each cubic symmetry are distinctive with respect to the two theta values, peak patterns, and peak intensities; however, in the case of broad XRD patterns with overlapped peaks, additional characterization techniques may also be used to confirm the symmetry. Ordered cubic mesoporosity may be identified from Bragg's reflections observed in the low-angle XRD region. In one or more embodiments, a mesoporous zeolite comprising mesopores ordered with cubic symmetry having an Ia-3d space group may exhibit peaks in an XRD spectrum at one or more of the (220), (321), (400), (420), or (322) reflections. In one or more embodiments, a mesoporous zeolite comprising mesopores ordered with cubic symmetry having a Fm-3m space group may exhibit peaks in an XRD spectrum at one or more of the (111), (220), (311), (331), or (442) reflections. In one or more embodiments, a mesoporous zeolite comprising mesopores ordered with cubic symmetry having a Pm-3n space group may exhibit peaks in an XRD spectrum at one or more of the (200), (210), (211), (300), (310), (411), or (331) reflections. In one or more embodiments, a mesoporous zeolite comprising mesopores ordered with cubic symmetry having a Pn-3m space group may exhibit peaks in an XRD spectrum at one or more of the (110), (111), (200), (211), (220), or (221) reflections. In one or more embodiments, a mesoporous zeolite comprising mesopores ordered with cubic symmetry having an Im-3m space group may exhibit peaks in an XRD spectrum at one or more of the (110), (200), (211), or (220) reflections. In one or more embodiments, a mesoporous zeolite comprising mesopores ordered with cubic symmetry having an Fd-3m space group may exhibit peaks in an XRD spectrum at one or more of the (220), (222), (331), or (440) reflections.

According to one or more embodiments, the mesoporous zeolites comprising a plurality of mesopores ordered with cubic symmetry may be produced as described herein. The mesoporous zeolites may be synthesized using base-mediated reassembly, which include dissolution of the zeolite and reassembly of the zeolite in the presence of a supramolecular template to produce a mesoporous zeolite comprising a plurality of mesopores ordered with cubic symmetry.

In one or more embodiments, the rate and extent of the zeolite dissolution may be controlled by employing urea as an in situ base, and by mediating hydrothermal temperature to control urea hydrolysis and by tuning the pH of the solution. The extent of dissolution of the zeolite may be controlled by interactions between the zeolite and supramolecular templating agent during the initial stages of dissolution, where influence of ion-specific interactions (the anionic Hofmeister effect) on supramolecular self-assembly directs formation of mesopores with cubic symmetry.

In one or more embodiments, a zeolite is included in an aqueous suspension with an alkaline reagent and a supramolecular templating agent. The aqueous suspension may include an ionic co-solute as an additional anion that is separate from the anion that is paired with the cation of the supramolecular templating agent. The system may be maintained under conditions to induce incision of the zeolite into oligomeric units of the zeolite, with only a minor portion of monomeric units, and to induce reassembly of the oligomeric units into mesostructures. System conditions, including temperature and time of crystallization, selection and concentration of the supramolecular template, and selection and concentration of the alkaline reagent are tailored to control incision of the zeolite into oligomeric units and to control reassembly of those oligomeric units around the shapes of supramolecular template micelles. Dissolution of the zeolite may be encouraged to the extent of oligomer formation while minimizing monomer formation, which is controlled by selection of supramolecular template, alkaline reagent, optional ionic co-solute and hydrothermal conditions (temperature and time). In one or more embodiments, at least 50 wt. %, at least 60 wt. %, at least 70 wt. %, at least 80 wt. %, at least 90 wt. %, or even at least 95 wt. % of the zeolite is cleaved into oligomeric units. In embodiments, a remaining portion of the zeolite may be in the form of monomeric units or even atomic constituents of the zeolite. In one or more embodiments, interface curvature of the micelles of the supramolecular template and the oligomeric units under reassembly may be tuned to a desired meso-structured and mesporosity with the aid of the ionic co-solute and the Hofmeister effect.

Under effective crystallization conditions and time, and using effective types of supramolecular template and alkaline reagent at effective relative concentrations, the zeolite may be incised into oligomeric units that rearrange around the shaped micelles formed by the supramolecular templates to form mesoporous zeolites comprising a plurality of mesopores ordered with cubic symmetry.

According to one or more embodiments, the curvature or shape of the micelles may result in the cubic symmetry of the mesopores of the mesoporous zeolite. Formation of the supramolecular template molecules into micelles is dependent upon factors such as the supramolecular template type, supramolecular template concentration, the presence or absence of an ionic co-solute, the zeolite material, the crystallization temperature, the type of alkaline reagent, the concentration of the alkaline reagent, the pH of the system, and/or the presence or absence of other reagents. In general, at concentrations less than a threshold micelle concentration, supramolecular templates exist as discrete entities. At concentrations greater than the threshold micelle concentration, micelles of the supramolecular template form. The hydrophobic interactions in the system including the supramolecular template alters the packing shape of the supramolecular templates into, for example, spherical, prolate, or cylindrical micelles, which can thereafter form thermodynamically stable two-dimensional or three-dimensional liquid crystalline phases of ordered mesostructures.

In one or more embodiments, the Hofmeister series, ion specific effect, or lyotropic sequence is followed for selection of supramolecular templates and ionic co-solute to control curvature or shape (e.g., spherical, ellipsoid, cylindrical, or unilamellar structures) of the micelles. In embodiments, distinct mesostructures are formed based on the anionic Hofmeister effect and supramolecular self-assembly. Anions of different sizes and charges possess different polarizabilities, charge densities, and hydration energies in aqueous solutions. When paired with a positive supramolecular template head group, these properties can affect the short-range electrostatic repulsions among the head groups and hydration at the micellar interface, thus changing the area of the head group. Such ion-specific interactions can be a driving force in changing the micellar curvature and inducing the mesophase transition. Based on the Hoffmeister series ($SO_4^{2-}>HPO_4^{2-}>OAc^{-}>Cl^{-}>Br^{-}>>NO_3^{-}>ClO_4^{-}>SCN^{-}$), strongly hydrated ions can increase the micellar curvature, whereas weakly hydrated ions can decrease the micellar curvature. A surfactant packing parameter can be used to describe the mesophase transitions. The surfactant packing parameter is give in Equation 1:

$$g = \frac{V}{a_0 l} \qquad \text{Equation 1}$$

In Equation 1, g is the surfactant packing parameter, V is the total volume of surfactant tails, $\alpha_0$ is the area of the head group, and/is the length of the surfactant tail.

In one or more embodiments, suitable alkaline reagents include one or more basic compounds to maintain the system at a pH level of greater than about 8. In one or more embodiments, the alkaline reagent is provided at a concentration in the aqueous suspension of about 0.1 M to about 2.0 M. In one or more embodiments, the alkaline reagent is provided at a concentration in the aqueous suspension of about 0.1 wt. % to 5 wt. %. The alkaline reagent may comprise urea, ammonia, ammonium hydroxide, sodium hydroxide, or combinations of these. In one or more embodiments, the alkaline reagent comprises alkali metal hydroxides including hydroxides of sodium, lithium, potassium, rubidium, or cesium.

In one or more embodiments, the alkaline reagent is effective to enable controlled hydrolysis; for example, urea can be used as an alkaline agent, and during hydrolysis urea reacts to form ammonium hydroxide. For example, higher urea concentration can be used in an initial step and basicity may be maintained by gradual urea hydrolysis. In such embodiments, pH is increased relatively slowly to a maximum pH as a function of time, which is beneficial to the process, rather than adding an amount of another alkaline reagent such as ammonium hydroxide in the initial solution to the maximum pH. Unlike conventional bases, which act swiftly, urea is PH neutral at ambient conditions and can disperse uniformly throughout the zeolitic micropores without affecting them.

In one or more embodiments, the alkaline reagent comprises alkylammonium cations, having the general formula $R_xH_{4-x}N^+[A-]$, wherein at X=1 to 4 and $R_1$, $R_2$, $R_3$ and $R_4$ can be the same or different C1-C30 alkyl groups, and wherein [A−] is a counter anion can be $OH^-$, $Br^-$, $Cl^-$, or $I^-$. In one or more embodiments, the alkaline reagent comprises quaternary ammonium cations with alkoxysilyl groups, phosphonium groups, an alkyl group with a bulkier substituent or an alkoxyl group with a bulkier substituent. In one or more embodiments, the alkylammonium cations used in this regard function as a base rather than as a surfactant or template.

In one or more embodiments, suitable surfactants as supramolecular templates are provided to assist the reassembly and recrystallization of dissolved components (oligomers) by covalent and/or electrovalent interactions. Supramolecular templates may be included in the aqueous suspension in a concentration of about 0.01 M to 0.5 M. In one or more embodiments, suitable supramolecular templates are provided at a concentration in the aqueous suspension of about 0.5 wt. % to 10 wt. %. Suitable supramolecular templates may be characterized by constrained diffusion within the micropore channels of zeolite. Diffusion of supramolecular template molecules into micropore channels or cavities encourages dissolution of the zeolite. This is minimized in the top-down methods for synthesis of the mesoporous zeolites comprising a plurality of mesopores ordered with cubic symmetry described herein, wherein effective supramolecular templates minimize diffusion or partial diffusion thereof into zeolite pore-channels, cavities or window openings. Such supramolecular templates may possess suitable dimensions to block such diffusion. The suitable dimensions can be a based on dimensions of a head group and/or a tail group of a supramolecular template. In certain embodiments suitable dimensions can be based on a co-template having one or more components with suitable head and/or tail groups, or being a template system arranged in such a way, as to minimize or block diffusion into zeolite pore-channels, cavities, or window openings. By minimizing diffusion of templates into the zeolite pore channels, zeolite dissolution into oligomers and comprehensive reorganization and assembly into the mesoporous zeolites comprising a plurality of mesopores ordered with cubic symmetry disclosed herein is encouraged. In certain embodiments, a supramolecular template is one in which at least a portion of the surfactant does not enter into pores and/or channels of the zeolite. For example, organosilanes (~0.7 nm) are relatively large compared to quaternary ammonium surfactants without such bulky groups including cetyltrimethylammonium bromide (CTAB) (~0.25 nm). In one or more embodiments, a supramolecular template contains a long chain linear group (>~0.6 nm). In one or more embodiments, a supramolecular template contains an aromatic or aromatic derivative group (>~0.6 nm). In one or more embodiments, supramolecular templates contain one or more bulky groups having a dimension based on modeling of molecular dimensions as a cuboid having dimensions A, B and C, using Van der Waals radii for individual atoms, wherein one or more, two or more, or all three of the dimensions A, B and C are sufficiently close in dimension, or sufficiently larger in dimension, that constrains diffusion into the micropores of the zeolite.

In one or more embodiments, an effective surfactant as a supramolecular template contains at least one moiety, as a head group or a tail group, selected from organosilanes, hydroxysilyls, alkoxysilyls, aromatics, branched alkyls, sulfonates, carboxylates, phosphates and combinations of these moieties. In one or more additional embodiments, an effective supramolecular template is an organosilane that comprises at least one hydroxysilyl as a head group moiety. In one or more embodiments, an effective supramolecular template is an organosilane that comprises at least one hydroxysilyl as a tail group moiety. In one or more further embodiments, an effective supramolecular template is an organosilane that comprises at least one alkoxysilyl as a head group moiety. In one or more embodiments, an effective supramolecular template is an organosilane that comprises at least one alkoxysilyl as a tail group moiety. In one or more additional embodiments, an effective supramolecular template comprises at least one aromatic as a head group moiety. In one or more further embodiments, an effective supramolecular template comprises at least one aromatic as a tail group moiety. In one or more additional embodiments, an effective supramolecular template comprises at least one branched alkyl as a head group moiety. In one or more embodiments, an effective supramolecular template comprises at least one branched alkyl as a tail group moiety. In one or more embodiments, an effective supramolecular template comprises at least one sulfonate as a head group moiety. In one or more further embodiments, an effective supramolecular template comprises at least one sulfonate as a tail group moiety. In one or more additional embodiments, an effective supramolecular template comprises at least one carboxylate as a head group moiety. In one or more embodiments, an effective supramolecular template comprises at least one carboxylate as a tail group moiety. In one or more embodiments, an effective supramolecular template comprises at least one phosphate as a head group moiety. In one or more additional embodiments, an effective supramolecular template comprises at least one phosphate as a tail group moiety. These moieties are characterized by one or more dimensions that constrain diffusion into pores of a zeolite. In certain embodiments, in which the zeolite is characterized by pores of various dimensions, the selected moieties are characterized by one or more dimensions that constrain diffusion into the largest pores the zeolite.

In one or more embodiments, an effective supramolecular template comprises at least one cationic moiety. In one or more further embodiments, an effective supramolecular template comprises at least one cationic moiety selected from a quaternary ammonium moiety and a phosphonium moiety. In one or more additional embodiments, an effective supramolecular template comprises at least one quaternary ammonium group having a terminal alkyl group with 6 to 24 carbon atoms. In one or more embodiments, an effective supramolecular template comprises two quaternary ammonium groups wherein an alkyl group bridging the quaternary ammonium groups contains 1 to 10 carbon atoms. In one or more additional embodiments, an effective supramolecular template comprises at least one quaternary ammonium group, and at least one constituent group, a head group moiety as described above. In one or more further embodiments, an effective supramolecular template comprises at least one quaternary ammonium group, and at least one constituent group, a tail group moiety as described above. In one or more embodiments, an effective supramolecular template contains at least one quaternary ammonium group, at least one constituent group, a head group moiety as described above, and an alkyl group that contains 1 to 10 carbon atoms bridging at least one of the quaternary ammonium groups and at least one of the head groups. In one or more further embodiments, an effective supramolecular template contains at least one quaternary ammonium group, at least one constituent group, a tail group moiety as described above, and an alkyl group that contains 1 to 10 carbon atoms bridging at least one of the quaternary ammonium groups and at least one of the tail groups.

In one or more embodiments, an effective supramolecular template comprises a quaternary ammonium compound and a constituent group comprising one or more bulky organosilane or alkoxysilyl substituents. In one or more additional embodiments, an effective supramolecular template comprises a quaternary ammonium compound and a constituent group comprising one or more long-chain organosilane or alkoxysilyl substituents. In certain embodiments an effective supramolecular template cation comprises dimethyloctadecyl (3-trimethoxysilyl-propyl)-ammonium or derivatives of dimethyloctadecyl (3-trimethoxysilyl-propyl)-ammonium. In one or more embodiments, an effective supramolecular template cation comprises dimethylhexadecyl (3-trimethoxysilyl-propyl)-ammonium or derivatives of dimethylhexadecyl (3-trimethoxysilyl-propyl)-ammonium. In one or more additional embodiments, an effective supramolecular template cation comprises a double-acyloxy amphiphilic organosilane such as [2,3-bis(dodecanoyloxy)-propyl] (3-(trimethoxysilyl) propyl)-dimethylammonium or derivatives of [2,3-bis(dodecanoyloxy)-propyl] (3-(trimethoxysilyl) propyl)-dimethylammonium.

In one or more embodiments, an effective supramolecular template comprises a quaternary phosphonium compound and a constituent group comprising one or more bulky aromatic substituents. In one or more embodiments, an effective supramolecular template comprises a quaternary phosphonium compound and a constituent group comprising one or more bulky alkoxysilyl or organosilane substituents.

In one or more embodiments, an effective supramolecular template contains a tail group moiety selected from the group consisting of aromatic groups containing 6 to 50, 6 to 25, 10 to 50 or 10 to 25 carbon atoms, alkyl groups containing 1 to 50, 1 to 25, 5 to 50, 5 to 25, 10 to 50 or 10 to 25 carbon atoms, aryl groups containing 1 to 50, 1 to 25, 5 to 50, 5 to 25, 10 to 50 or 10 to 25 carbon atoms, or a combination of aromatic and alkyl groups having up to 50 carbon atoms. In one or more embodiments, an effective supramolecular template comprises a head group moiety selected from the group consisting of aromatic groups containing 6 to 50, 6 to 25, 10 to 50 or 10 to 25 carbon atoms, alkyl groups containing 1 to 50, 1 to 25, 5 to 50, 5 to 25, 10 to 50 or 10 to 25 carbon atoms, aryl groups containing 1 to 50, 1 to 25, 5 to 50, 5 to 25, 10 to 50 or 10 to 25 carbon atoms, or a combination of aromatic and alkyl groups having up to 50 carbon atoms. In one or more embodiments, an effective supramolecular template contains co-templated agents selected from the group consisting of quaternary ammonium compounds (including for example quaternary alkyl ammonium cationic species) and quaternary phosphonium compounds.

In one or more embodiments, effective supramolecular templates comprise (a) at least one of: aromatic quaternary ammonium compounds, branched alkyl chain quaternary ammonium compounds, alkyl benzene sulfonates, alkyl benzene phosphonates, alkyl benzene carboxylates, or substituted phosphonium cations; and (bl) and a constituent group comprising at least one of organosilanes, hydroxysilyls, alkoxysilyls, aromatics, branched alkyls, sulfonates, carboxylates or phosphates, as a head group; or (b2) and a constituent group comprising at least one of organosilanes, hydroxysilyls, alkoxysilyls, aromatics, branched alkyls, sulfonates, carboxylates or phosphates, as a tail group. In one or more embodiments, effective supramolecular templates include a sulfonate group (a non-limiting example is sulfonated bis(2-hydroxy-5-dodecylphenyl) methane (SBHDM). In one or more further embodiments, effective supramolecular templates include a carboxylate group (a non-limiting example is sodium 4-(octyloxy) benzoate). In one or more additional embodiments, effective supramolecular templates include a phosphonate group (a non-limiting example is tetradecyl (1,4-benzene) bisphosphonate). In one or more embodiments, effective supramolecular templates include an aromatic group (a non-limiting example is benzylcetyldimethylammonium chloride). In one or more additional embodiments, effective supramolecular templates include an aliphatic group (a non-limiting example is tetraoctylammonium chloride).

The supramolecular template is provided as a cation/anion pair. In one or more embodiments, a cation of a supramolecular template is as described above is paired with an anion, such as $Cl^-$, $Br^-$, OH, $P^-$, and $I^-$. In one or more further embodiments, a cation of a supramolecular template is as described above is paired with an anion such as $Cl^-$, $Br^-$, and OH. In one or more embodiments, an effective supramolecular template comprises dimethyloctadecyl [3-(trimethoxysilyl) propyl] ammonium chloride (commonly abbreviated as "TPOAC") or derivatives of dimethyloctadecyl [3-(trimethoxysilyl) propyl] ammonium chloride. In one or more additional embodiments, an effective supramolecular template comprises dimethylhexadecyl [3-(trimethoxysilyl) propyl] ammonium chloride or derivatives of dimethylhexadecyl [3-(trimethoxysilyl) propyl] ammonium chloride. In one or more further embodiments an effective supramolecular template comprises [2,3-bis(dodecanoyloxy)-propyl] (3-(trimethoxysilyl) propyl)-dimethylammonium iodide or derivatives of [2,3-bis(dodecanoyloxy)-propyl] (3-(trimethoxysilyl) propyl)-dimethylammoniumiodide.

In one or more embodiments, the system includes an effective amount of an ionic co-solute (that is, in addition to the anion paired with the supramolecular template). In one or more embodiments in which an ionic co-solute is used, the ionic co-solute is provided at a concentration in the aqueous suspension of about 0.01 M to about 0.5 M. In one or more embodiments in which an ionic co-solute is used, the ionic co-solute is provided at a concentration in the aqueous suspension of about 0.01 wt. % to about 5 wt. %. In one or more embodiments, an ionic co-solute is selected from the group consisting of $CO_3^{2-}$, $SO_4^{2-}$, $S_2O_3^{2-}$, $H_2PO_4^-$, $F^-$, $Cl^-$, $Br^-$, $NO_3^-$, $I^-$, $ClO_4^-$, $SCN^-$, and $C_6H_5O_8^{3-}$ (citrate). In one or more embodiments, an ionic co-solute is selected based on the Hofmeister series/Lyotropic series to control the curvature/shape of the micelles to yield the desired cubic mesophase symmetry. In one or more embodiments a nitrate ($NO_3^-$) is an ionic co-solute selected based on the Hofmeister series/Lyotropic series to control the curvature/shape of the micelles to yield mesoporous zeolites comprising a plurality of mesopores ordered with cubic symmetry. In one or more embodiments using nitrate as an ionic co-solute, a nitrate salt is used, such as ammonium nitrate or a metal nitrate, wherein the metal can be an alkali metal, an alkali earth metal, a transition metal, a noble metal or a rare earth metal.

According to one or more embodiments described herein, the method of forming mesoporous zeolites comprising a plurality of mesopores ordered with cubic symmetry comprises base-mediated dissolution/incision of zeolite into oligomeric components, and reorganization of the oligomeric components by supramolecular templating, and in certain embodiments by the Hofmeister effect. The zeolite is provided in crystalline form. An effective amount of an alkaline reagent and an effective amount of a surfactant for supramolecular templating are added to form an aqueous suspension, and that suspension is maintained under hydrothermal conditions to form oligomeric units of the zeolite. The supramolecular template molecules form into shaped micelles and oligomeric zeolite units reassemble and crystallize around the shaped micelles as an ordered mesostructured having mesopores of cubic symmetry and mesopore walls formed of the oligomeric zeolite units, thereby retaining micropores of the underlying zeolite structure. In one or more embodiments, the shaped micelles may be removed, for example by: chemical methods such as solvent extraction, chemical oxidation, or ionic liquid treatment; or physical methods such as calcination, supercritical $CO_2$, microwave-assisted treatment, ultrasonic assisted treatment, ozone treatment, or plasma technology. Without being bound by theory, it is believed that the removal of the micelles forms at least a portion of the mesopores of the mesoporous zeolite, where the mesopores are present in the space once inhabited by the micelles.

An effective amount of a solvent may be used in the process. In one or more embodiments, the solvent comprises water. In one or more embodiments, the solvent is water in the presence of co-solvents selected from the group consisting of polar solvents, non-polar solvents and pore swelling agents (such as 1,3,5-trimethylbenzene). In one or more embodiments, the solvent selected from the group consisting of polar solvents, non-polar solvents and pore swelling agents (such as 1,3,5-trimethylbenzene), in the absence of water. In an embodiment, mixture components are added with water to the reaction vessel prior to heating. Without intending to be bound by theory, water allows for adequate mixing to realize a more homogeneous distribution of the suspension components, which ultimately produces a more desirable product because each crystal is more closely matched in properties to the next crystal.

According to embodiments, the suspension components may be combined in any suitable sequence and are sufficiently mixed to form a homogeneous distribution of the suspension components. The suspension can be maintained in an autoclave under autogenous pressure (from the components or from the components plus an addition of a gas purge into the vessel prior to heating), or in another suitable vessel, under agitation such as by stirring, tumbling and/or shaking. Mixing of the suspension components is conducted between about 20° C. and about 60° C.

The steps of incision and reassembly may occur during hydrothermal treatment to form a solid product (mesoporous zeolite comprising a plurality of mesopores ordered with cubic symmetry) suspended in a supernatant (mother liquor). Hydrothermal treatment may be conducted: for a period of about 4 hrs. to 168 hrs., 12 hrs. to 168 hrs., 24 hrs. to 168 hrs., 4 hrs. to 96 hrs., 12 hrs. to 96 hrs. or 24 hrs. to 96 hrs.; at a temperature of about 70° C. to 250° C., 70° C. to 210° C., 70° C. to 180° C., 70° C. to 150° C., 90° C. to 250° C., 90° C. to 210° C., 90° C. to 180° C., 90° C. to 150° C., 110° C. to 250° C., 110° C. to 210° C., 110° C. to 180° C., or 110° C. to 150° C.; and at a pressure of about atmospheric to autogenous pressure. In one or more embodiments, hydrothermal treatment occurs in a vessel that is the same as that used for mixing, or the suspension is transferred to another vessel (such as another autoclave or low-pressure vessel). In one or more embodiments, the vessel used for hydrothermal treatment is static. In one or more embodiments, the vessel used for hydrothermal treatment is under agitation that is sufficient to suspend the components.

The solid product, the mesoporous zeolite comprising a plurality of mesopores ordered with cubic symmetry) are recovered using techniques such as centrifugation, decanting, gravity settling, vacuum filtration, filter press, or rotary drums. The recovered solid product is dried, for example at a temperature of about 50° C. to 150° C., at atmospheric pressure or under vacuum conditions, for a time of about 0.5 hrs. to 96 hrs.

In one or more embodiments, the solid product is calcined to remove supramolecular templates that remain in the mesopores and other constituents from the mesopores and/or the discrete zeolite cell micropores. The conditions for calcination, in embodiments in which it is carried out, can include temperatures in the range of about 350° C. to 650° C., 350° C. to 600° C., 350° C. to 550° C., 500° C. to 650° C., 500° C. to 600° C., or 500° C. to 550° C., atmospheric pressure or under vacuum, and a time period of about 2.5 hrs. to 24 hrs., 2.5 hrs. to 12 hrs., 5 hrs. to 24 hrs., or 5 hrs. to 12 hrs. Calcining can occur with ramp rates in the range of from about 0.1 to 10° C. per minute. In one or more embodiments, calcination can have a first step ramping to a temperature of between about 100° C. and 150° C. with a holding time of from about 1 to 12 hours at ramp rates of from about 0.1 to 5° C. per min. before increasing to a higher temperature with a final holding time in the range of about 1 to 12 hours.

According to one or more embodiments disclosed herein, the mesoporous zeolites comprising a plurality of mesopores ordered with cubic symmetry may serve as an "initial zeolite" which is then dehydroxylated, forming a dehydroxylated zeolite. In general, the initial zeolite may refer to a zeolite, which is not substantially dehydroxylated and includes at least a majority of vicinal hydroxyl groups. Dehydroxylation, as is commonly understood by those skilled in art, involves a reaction whereby a water molecule is formed by the release of a hydroxyl group and its combination with a proton. The initial zeolite may primarily comprise vicinal silanol functionalities. In one or more embodiments, dehydroxylating the initial zeolite may form isolated terminal silanol functionalities comprising hydroxyl groups bonded to silicon atoms of the microporous framework of the dehydroxylated zeolite. Such isolated silanol functionalities may be expressed as ≡Si—O—H.

As described herein "silanol functionalities" refer to ≡Si—O—H groups. Silanol groups generally include a silicon atom and a hydroxyl group (—OH). As described herein, "terminal" functionalities refer to those that are bonded to only one other atom. For example, the silanol functionality may be terminal by being bonded to only one other atom such as a silicon atom of the microporous framework. As described herein, "isolated silanol functionalities" refer to silanol functionalities that are sufficiently distant from one another such that hydrogen-bonding interactions are avoided with other silanol functionalities. These isolated silanol functionalities are generally silanol functionalities on the zeolite that are non-adjacent to other silanol functionalities. Generally, in a zeolite that includes silicon and oxygen atoms, "adjacent silanols" are those that are directly bonded through a bridging oxygen atom. Isolated silanol functionalities may be identified by FT-IR and/or $^1$H-NMR, as would be understood by those skilled in the art. For example, isolated silanol functionalities may be characterized by a sharp and intense FT-IR band at about 3747 $cm^{-1}$ and/or a $^1$H-NMR chemical shift at about 1.8 ppm. In the embodiments described herein, peaks at or near 3747 $cm^{-1}$ in FT-IR and/or at or near 1.8 ppm in $^1$H-NMR may signify the existence of the dehydroxylated zeolite, and the lack of peaks at or near these values may signify the existence of the initial zeolite.

Isolated silanol functionalities can be contrasted with vicinal silanol functionalities, where two silanol functionalities are "adjacent" one another by each being bonded with a bridging oxygen atom. Chemical Structure #2A depicts an isolated silanol functionality and Chemical Structure #2B depicts a vicinal silanol functionality. Hydrogen bonding occurs between the oxygen atom of one silanol functionality and the hydrogen atom of an adjacent silanol functionality in the vicinal silanol functionality. Vicinal silanol functionality may show a different band in FT-IR and $^1$H-NMR, such as 3520 $cm^{-1}$ or 3720 $cm^{-1}$ in FT-IR, and 3 ppm in $^1$H-NMR.

Chemical Structure # 2A

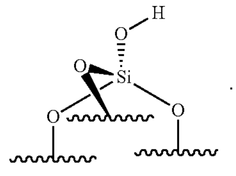

Chemical Structure # 2B

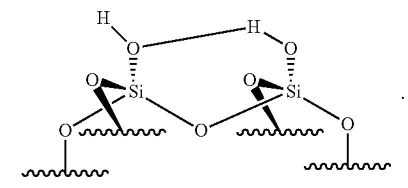

As described herein, a "dehydroxylated zeolite" refers to a zeolitic material that has been at least partially dehydroxylated (i.e., H and O atoms are liberated from the initial zeolite and water is released). Without being bout by theory, it is believed that the dehydroxylation reaction forms a molecule of water from a hydroxyl group of a first silanol and a hydrogen of a second silanol of a zeolite. The remaining oxygen atom of the second silanol functionality forms a siloxane group in the zeolite (i.e., (≡Si—O—Si≡), sometimes referred to as a strained siloxane bridge. Generally, strained siloxane bridges are those formed in the dehydroxylation reaction and not in the formation of the initial zeolite.

In one or more embodiments, the initial zeolite (as well as the dehydroxylated zeolite) comprises aluminum in addition to silicon and oxygen. For example, ZSM-5 zeolite may include such atoms. In embodiments with aluminum present, the microporous framework of the dehydroxylated zeolite may include Bronsted acid silanol functionalities. In the Bronsted acid silanol functionalities, each oxygen atom of the Bronsted acid silanol functionality may bridge a silicon atom and an aluminum atom of the microporous framework. Such Bronsted acid silanol functionalities may be expressed as [≡Si—O(H)→Al≡].

Chemical Structure #3 depicts an example of an aluminosilicate zeolite framework structure that includes the isolated terminal silanol functionalities and Bronsted acid silanol functionalities described herein.

Chemical Structure #3

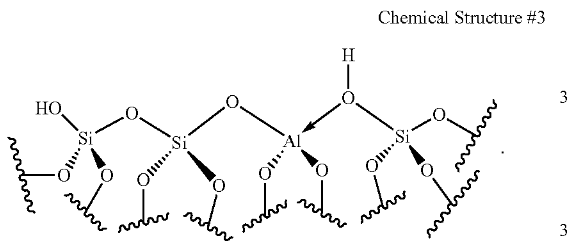

According to one or more embodiments, the dehydroxylation of the initial zeolite may be performed by heating the initial zeolite at elevated temperatures under vacuum, such as from 700° C. to 1100° C. It is believed that according to one or more embodiments described herein, heating at temperatures below 650° C. may be insufficient to form terminal isolated silanol functionalities. However, heating at temperatures greater than 1100° C. may result in the elimination of terminal isolated silanol functionalities, or the production of such functionalities in low enough concentrations that further processing by contact with organometallic chemicals to form organometallic moieties is not observed, as is described subsequently herein.

According to embodiments, the temperature of heating may be from 650° C. to 700° C., from 700° C. to 750° C., from 750° C. to 800° C., from 800° C. to 850° C., from 850° C. to 900° C., from 900° C. to 950° C., from 950° C. to 1000° C., from 1000° C. to 1050° C., from 1050° C. to 1100° C., or any combination of these ranges. For example, temperature ranges from 650° C. to any named value are contemplated, and temperature ranges from any named value to 1100° C. are contemplated. As described herein, vacuum pressure refers to any pressure less than atmospheric pressure. According to some embodiments, the pressure during the heating process may be less than 10-2 mbar, less than 10-2.5 mbar, less than 10-3 mbar, less than 10-3.5 mbar, less than 10-4 mbar, or even less than 10-4.5 mbar. The heating times may be sufficiently long such that the zeolite is brought to thermal equilibrium with the oven or other thermal apparatus utilized. For example, heating times of greater than 8 hours, greater than 12 hours, or greater than 18 hours may be utilized. For example, 24 hours of heating time may be utilized.

Without being bound by any particular theory, it is believed that greater heating temperatures during dehydroxylation correlate with reduced terminal silanols present on the dehydroxylated zeolite. However, it is believed that greater heating temperatures during dehydroxylation correlate with greater amounts of strained siloxanes. For example, when the initial zeolite is heated at 700° C. during dehydroxylation, the concentration of isolated terminal silanol groups may be at least 0.4 mmol/g, such as approximately 0.45 mmol/g in some embodiments, as measured by methyl lithium titration. Dehydroxylating at 1100° C. may result in much less isolated terminal silanol and much less isolated Bronsted acid silanol. In some embodiments, less than 10% of the isolated terminal silanol groups present at 700° C. dehydroxylation are present when 1100° C. dehydroxylation heating is used. However, it is believed that strained siloxane groups are appreciably greater at these greater dehydroxylation temperatures. As is described subsequently herein, the dehydroxylation temperature may affect the amine functionalization by ammonia processing.

In one or more embodiments, the dehydroxylated zeolite may be processed to form the modified zeolite. Generally, to form the modified zeolite, ammonia or other amine compounds, such as aniline, at an elevated temperature, may be contacted and/or reacted with the dehydroxylated zeolite. According to one or more embodiments, the temperature for the ammonia treatment may be from 200° C. to 900° C.

In one or more embodiments, it is believed that contacting of the dehydroxylated zeolite with ammonia may result in the formation of the modified zeolite. Chemical Structure #4 depicts a reaction scheme whereby the dehydroxylated zeolite is converted to a modified zeolite. In particular, the isolated terminal silanol functionalities may be converted to primary amine functionalities on the modified zeolite. Additionally, in embodiments where aluminum is present in the zeolitic framework structure and Bronsted acid silanols are present in the dehydroxylated zeolite, a primary amine may be formed where the nitrogen atom of the primary amine is coordinated with an aluminum atom.

Chemical Structure #4

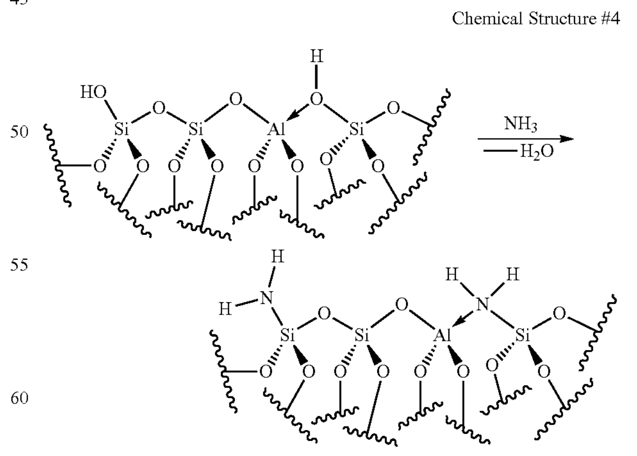

As is depicted in Chemical Structure #4, in one or more embodiments, isolated terminal amine functionalities may be bonded to silicon atoms of the microporous framework (sometimes referred to as silylamine groups herein). The isolated terminal amine functionalities may be primary amine functionalities such that the nitrogen atom of the primary amine functionality is bonded to two hydrogen atoms and one silicon atom of the microporous framework. Similar to the description of isolated and terminal in the context of silanol groups in the dehydroxylated zeolite, the isolated terminal amine functionalities refer to amine functionalities which are terminal by being bound to only one other atom (i.e., the silicon atom of the framework of the zeolite in this case) and are isolated by not being adjacent to other amine functionalities. In general, isolated silanol functionalities in the dehydroxylated zeolite may be converted to their corresponding isolated amine functionalities in the modified zeolite.

In one or more embodiments, the modified zeolite may comprise from 0.5 mmol/g to 3.0 mmol/g isolated terminal primary amine functionalities. For example, the modified zeolite may comprise isolated terminal primary amine functionalities from 0.5 mmol/g to 3.0 mmol/g, from 1.0 mmol/g to 3.0 mmol/g, from 1.5 mmol/g to 3.0 mmol/g, from 2.0 mmol/g to 3.0 mmol/g, from 2.5 mmol/g to 3.0 mmol/g, from 0.5 mmol/g to 2.5 mmol/g, from 0.5 mmol/g to 2.0 mmol/g, from 0.5 mmol/g to 1.5 mmol/g, from 0.5 mmol/g to 1.0 mmol/g, or any range or combination of ranges formed from these end points.

Additionally, as is depicted in Chemical Structure #4, in embodiments where aluminum is present in the zeolite, the modified zeolite may comprise primary amine groups bonded to silicon atoms of the framework (sometimes referred to as silylamine groups) coordinated with an aluminum atom of the framework structure. As described herein, a silylamine group refers to ≡Si—$NH_2$ in the zeolite. The silylamine group thus includes a nitrogen atom bonded to a first hydrogen, a second hydrogen, and a silicon atom of the zeolitic framework structure. The silylamine may include a primary amine since the nitrogen atom is bonded with two hydrogens and one non-hydrogen atom (the silicon of the zeolitic framework). The nitrogen atom is further coordinated with an aluminum atom of the zeolitic framework, as [≡Si—$NH_2$→Al≡].

According to embodiments, the reaction of Chemical Structure #4 may occur at temperatures of at least 400° C. Generally, with increasing temperatures, additional reaction may take place, as is described subsequently. It is believed that additional reactions may be minimized when temperatures of less than 600° C. are utilized during the amine functionalization step. In one or more embodiments, the amount of primary amine functionalities may be quantified by nitrogen elemental analysis or titration with BuLi or MeLi.

In one or more embodiments, when temperatures of at least 600° C. are utilized during amine functionalization, additional reactions take place which may form other amine functionalities. Chemical Structure #5 shows secondary amine functionalities that may form at relatively high temperatures during ammonia treatment.

Chemical Structure #5

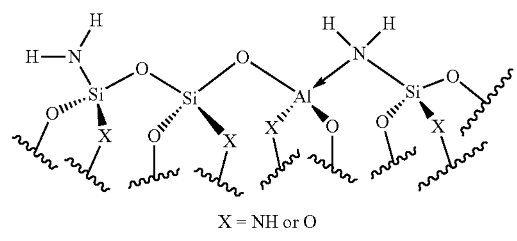

X = NH or O

In one or more embodiments, as is shown in Chemical Structure #6 silazane groups may be formed. Silazanes, as described herein, refer to ≡Si—NH—Si≡ groups. Silazanes can be considered secondary amines since the nitrogen atom is bonded to two silicon atoms. In embodiments where alumina is present in the zeolite, silylamine that are coordinated with aluminum atoms may be present in the modified zeolites. Chemical Structure #6, below, shows a mechanism by which isolated terminal silylamine groups (previously formed by ammonia treatment at least at 400° C.) and strained siloxane bridges (formed during dehydroxylation at high temperature) may be converted to silazanes. As depicted in Chemical Structure #6, silazane functionalities may be coordinated with aluminum atoms where aluminum is present in the microstructure of the zeolite. The mechanism for the formation of silazanes coordinated with aluminum atoms may be formed by a similar mechanism as shown in Chemical Structure #6. Silazane bridges may be characterized by FT-IR vibrational band at 3386 $cm^{-1}$.

Chemical Structure #6

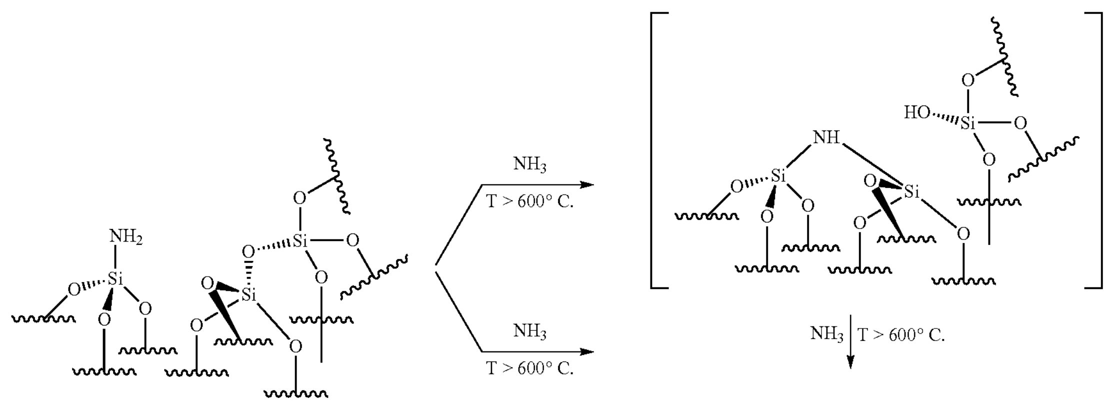

-continued

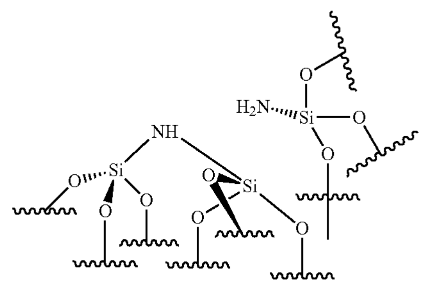

In one or more embodiments, the modified zeolite may comprise from 1.5 mmol/g to 3.0 mmol/g silazane functionalities. For example, without limitation, the modified zeolite may comprise silazane functionalities from 1.5 mmol/g to 3.0 mmol/g, from 2.0 mmol/g to 3.0 mmol/g, from 2.5 mmol/g to 3.0 mmol/g, from 1.5 mmol/g to 2.5 mmol/g, from 1.5 mmol/g to 2.0 mmol/g, or any range or combination of ranges formed from these endpoints. Without intending to be bound by theory, the concentration of silazane functionalities may depend, at least in part, on the temperatures of the dehydroxylation process and the amine functionalization step.

According to various embodiments, combinations of temperatures in dehydroxylation and amine functionality formation promote certain functionalities present in the modified zeolite. Various combinations are described herein. However, it should be understood that in many embodiments the heating temperature during amine functionalization by ammonia contacting is less than or equal to the dehydroxylation temperature. In such embodiments, the degree of dehydroxylation can be controlled by the dehydroxylation temperature since higher temperatures are not utilized post dehydroxylation.

In one or more embodiments, dehydroxylation temperatures may be relatively low (e.g., 800° C. or less) and amine functionalization temperatures may be any temperature less than or equal to the temperature of the dehydroxylation heating. As described herein, relatively low dehydroxylation temperatures may promote the formation of isolated terminal silanol groups. In such embodiments, strained siloxane bridges may be relatively low in concentration. Chemical Structure #7 shows a general reaction scheme for such an embodiment. The non-strained siloxane groups (present in the initial zeolite) are largely unaffected by the ammonia treatment at relatively low temperatures. Such embodiments may be rich in isolated terminal siloxane groups, which may be utilized for grafting of organometallic moieties. Such embodiments may be desirable for organometallic grafting as described herein.

Chemical Structure #7

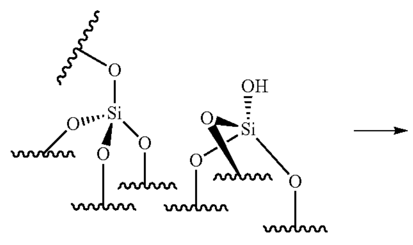

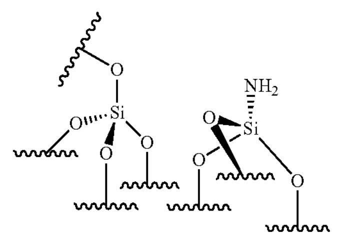

According to additional embodiments, the dehydroxylation heating temperature is relatively high (e.g., greater than 800° C. or even greater than 900° C.). As described herein, such a dehydroxylation temperature may preference the formation of strained siloxane bridges over isolated terminal silanol moieties. Chemical Structure #8 depicts a reaction mechanism whereby a strained siloxane moiety of a dehydroxylated zeolite may form hydroxyl groups and amine groups at temperatures of 200° C. and greater, and may subsequently from bis-silylamine pairs at temperatures of at least 400° C. These silylamine pairs may not be desirable for organometallic grafting applications as they are neighboring and are not considered to be "isolated" amine moieties as described herein. While they may not be strictly adjacent, they are nearby since they are formed from the cleavage of a siloxane bridge.

Chemical Structure #8

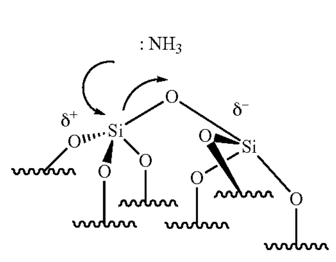

Strained siloxane bridge
Silica dehydroxylated > 800° C.

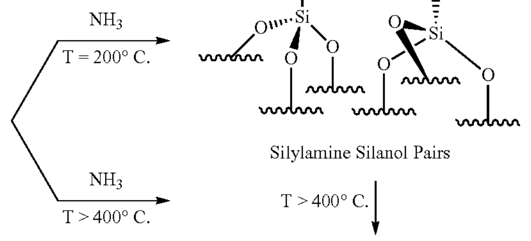

Silylamine Silanol Pairs

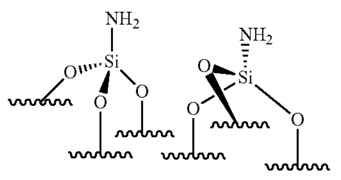

Bis-Silylamine Pairs

Without being bound by theory, it is believed that ammonia treatment at temperatures greater than 900° C. will result in the formation of oxynitride functionalities. Such materials include nitrogen atoms bonded to three silicon atoms (i.e., a tertiary amine). Such tertiary amines may not be desired in the embodiments disclosed herein. Chemical Structure #9 depicts a reaction pathway whereby silicon oxynitride is formed by exposure to ammonia at temperatures greater than 900° C.

Chemical Structure #9

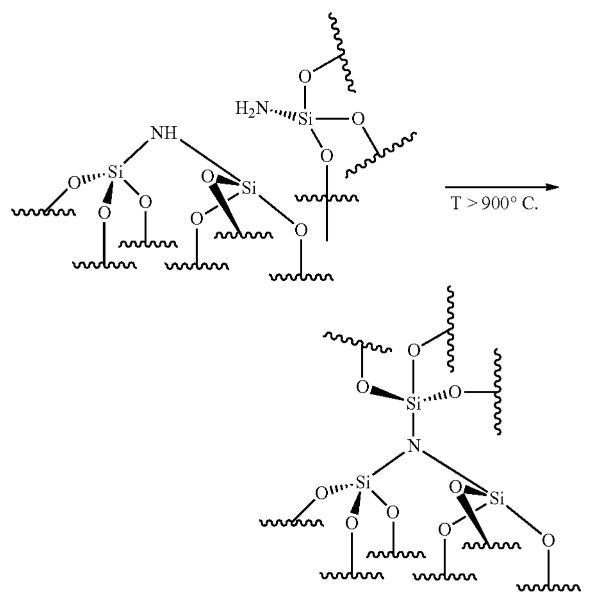

According to additional embodiments, modified zeolites may be prepared which include isolated terminal silanol moieties as well as silazane groups coordinated with aluminum atoms of the microporous framework. Without being bound by any particular theory, it is believed that relatively low dehydroxylation temperatures paired with very low ammonia contacting temperatures may produce such a zeolite. As described herein, dehydroxylation temperatures of less than or equal to 800° C. may form isolated terminal amine functionalities and Bronsted acid silanol functionalities that bridge a silicon atom and an aluminum atom of the microporous framework. Utilizing temperatures of less than 300° C. during amine modification may not substantially affect the isolated terminal amine functionalities but may form terminal primary amine functionalities bonded to silicon atoms of the microporous framework, wherein the terminal amine functionalities are coordinated with aluminum atoms of the microporous framework.

In one or more embodiments, the modified zeolite may comprise Bronsted acid moieties and Lewis acid moieties. As described herein, "Bronsted acid moieties" refer to moieties capable of donating a proton to a base, and "Lewis acid moieties" refer to moieties that are electron-pair acceptors. Lewis acid moieties may be formed at defects in the zeolite, amorphous portions of the zeolite, and extra-framework Al species. As previously described, Bronsted acid moieties may include [≡Si—O(H)→Al≡]. In one or more embodiments, the modified zeolite may comprise Lewis acid moieties and Bronsted acid moieties where a ratio of Lewis acid moieties to Bronsted acid moieties is from 6.2 to 7.9. For example, the ratio of Lewis acid moieties to Bronsted acid moieties in the modified zeolite may be from 6.2 to 7.9, from 6.4 to 7.9, from 6.6 to 7.9, from 6.8 to 7.9, from 7.0 to 7.9, from 7.2 to 7.9, from 7.4 to 7.9, from 7.6 to 7.9, from 7.8 to 7.9, from 6.2 to 7.7, from 6.2 to 7.5, from 6.2 to 7.3, from 6.2 to 7.1, from 6.2 to 6.9, from 6.2 to 6.7, from 6.2 to 6.5, from 6.2 to 6.3, or any range or combination of ranges formed from these endpoints.

In one or more embodiments, the modified zeolite may have a total acidity from 100 μmol/g to 250 μmol/g. As described herein, "total acidity" refers to the amount of acid sites in a portion of the zeolite material. Total acidity is determined ex-situ. Without intending to be bound by theory, the acidity of a zeolite at in-situ reaction conditions may be different due to high temperature and pressure conditions. For example, the modified zeolite may have a total acidity from 100 μmol/g to 250 μmol/g, from 120 μmol/g to 250 μmol/g, from 140 μmol/g to 250 μmol/g, from 160 μmol/g to 250 μmol/g, from 180 μmol/g to 250 μmol/g, from 200 μmol/g to 250 μmol/g, from 220 μmol/g to 250 μmol/g, from 240 μmol/g to 250 μmol/g, from 100 μmol/g to 240 μmol/g, from 100 μmol/g to 230 μmol/g, from 100 μmol/g to 220 μmol/g, from 100 μmol/g to 210 μmol/g, from 100 μmol/g to 200 μmol/g, from 100 μmol/g to 190 μmol/g, from 100 μmol/g to 180 μmol/g, from 100 μmol/g to 170 μmol/g, from 100 μmol/g to 160 μmol/g, from 100 μmol/g to 150 μmol/g, from 100 μmol/g to 140 μmol/g, from 100 μmol/g to 130 μmol/g, from 100 μmol/g to 120 μmol/g, from 100 μmol/g to 110 μmol/g, or any range or combination of ranges formed from these endpoints. Without intending to be bound by theory, the total acidity of a zeolite material is affected by the presence of silanol functionalities. Replacement of silanol functionalities with amine functionalities may alter the acidity and functional properties of the modified zeolite.

It should be understood that, according to one or more embodiments, presently disclosed, the various functional groups of the zeolites may be identified by FT-IR and/or $^1$H-NMR methods. When a zeolite "comprises" such a moiety, such inclusion may be evidenced by a peak at or near the bands in FT-IR and/or $^1$H-NMR corresponding to such moiety. Those skilled in the art would understand such detection methods.

In one or more embodiments, the presently disclosed modified zeolites may be suitable for use as catalysts in refining, petrochemicals, and chemical processing. For example, a hydrocarbon feedstock may be contacted with a modified zeolite described herein to from a product. Table 1 shows some contemplated catalytic functionality for the presently disclosed modified zeolites, and provides the framework type of the zeolite that may be desirable. However, it should be understood that the description of Table 1 should not be construed as limiting on the possible uses for modified zeolites presently disclosed.

TABLE 1

| Catalytic Reaction | Target Description | Framework of zeolite components of catalyst |
|---|---|---|
| Catalytic cracking | To convert high boiling, high molecular mass hydrocarbon fractions to more valuable gasoline, olefinic gases, and other products | FAU, MFI |
| Hydrocracking | To produce diesel with higher quality | FAU, BEA |
| Gas oil hydrotreating/Lube hydrotreating | Maximizing production of premium distillate by catalytic dewaxing | FAU, MFI |
| Alkane cracking and alkylation of aromatics | To improve octane and production of gasolines and BTX | MFI |
| Olefin oligomerization | To convert light olefins to gasoline & distillate | FER, MFI |
| Methanol dehydration to olefins | To produce light olefins from methanol | CHA, MFI |
| Heavy aromatics transalkylation | To produce xylene from C9+ | MFI, FAU |
| Fischer-Tropsch Synthesis FT | To produce gasoline, hydrocarbons, and linear alpha-olefins, mixture of oxygenates | MFI |
| $CO_2$ to fuels and chemicals | To make organic chemicals, materials, and carbohydrates | MFI |

According to additional embodiments, the presently disclosed amine functionalized zeolites may be suitable for use in separation and/or mass capture processes. For example, the presently disclosed amine functionalized zeolites may be useful for adsorbing $CO_2$ and for separating p-xylene from its isomers.

According to one or more additional embodiments, the presently disclosed modified zeolites may be further modified by the inclusion of organometallic moieties. Such organometallic moieties may be grafted to the amine functionalized zeolites. Without being bound by theory, it is believed that, though processes such as impregnation, organometallic moieties may be bonded onto the isolated terminal primary amine functional groups of the amine modified zeolites.

EXAMPLES

The various embodiments of methods and systems for forming functionalized zeolites will be further clarified by the following examples. The examples are illustrative in nature and should not be understood to limit the subject matter of the present disclosure.

Example 1—Synthesis of a Zeolite Comprising Mesopores Ordered with Cubic Symmetry A quantity of 1.2 grams of urea was dissolved in 60.0 g of water to form a homogeneous solution. To this mixture, 0.2 g of ammonium nitrate ($NH_4NO_3$) was added to the mixture, and the mixture was stirred to form a homogeneous solution. 2.0 g of zeolite Y (obtained from Zeolyst International, product name CBV 720) was added to the mixture, and the mixture was stirred for 10 minutes. Subsequently, 3.0 milliliters of an organosilane, dimethyloctadecyl (3-trimethoxysilyl-propyl)-ammonium chloride (42.0 wt. % in methanol), was added to the mixture. The resulting solution was stirred for 0.5 hours, followed by hydrothermal treatment at 130° C. for 72 hours. The resulting mixture was filtered, washed with water and dried at 120° C. for 24 hours. The synthesized product was calcined in air at 550° C. for 6 hours with a ramp rate of 60° C./hour to yield a zeolite comprising mesopores ordered with cubic symmetry.

Figure 1B:
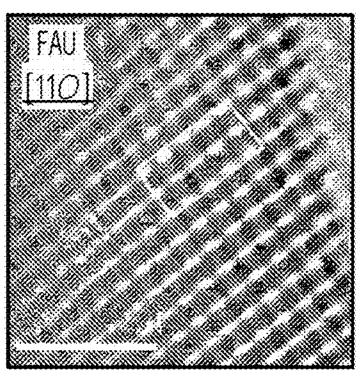
FIG. 1B depicts a TEM micrograph of the zeolite comprising mesopores ordered with cubic symmetry of Example 1.
Figure 1B:
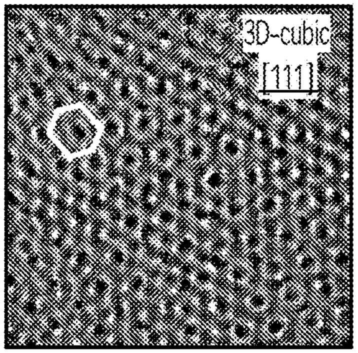
Figure 1C:
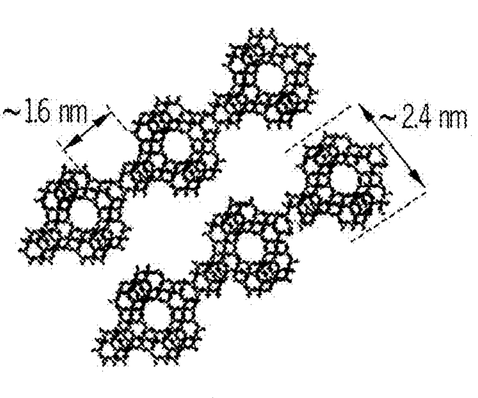
FIG. 1C schematically depicts a FAU unit cell schematic and their arrangement to provide mesopores with cubic symmetry according to one or more embodiments described herein.
Figure 1C:
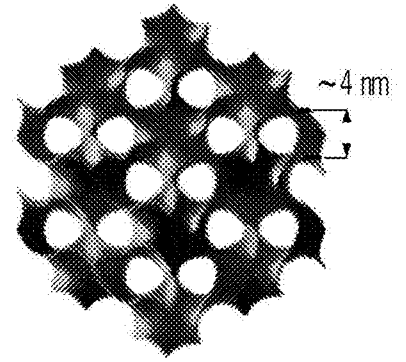

The zeolite comprising mesopores ordered with cubic symmetry of Example 1, was analyzed by transmission electron microscopy (TEM) using a PEI-Titan ST electron microscope operated at 300 kV. FIGS. 1A and 1B are TEM micrographs of the zeolite comprising mesopores ordered with cubic symmetry of Example 1, showing cubic mesoporous channels in the and [111] directions with FAU micropore channels in the walls of the mesostructure. FIG. 1A shows the TEM micrograph at a scale of 100 nanometers, and FIG. 1B shows the TEM micrograph in the [110] direction and in the [111] direction at a scale of 20 nanometers. Additionally, FIG. 1C depicts a FAU unit cell schematic and their arrangement to provide mesopores with cubic symmetry.

Figures 2A, 2B:
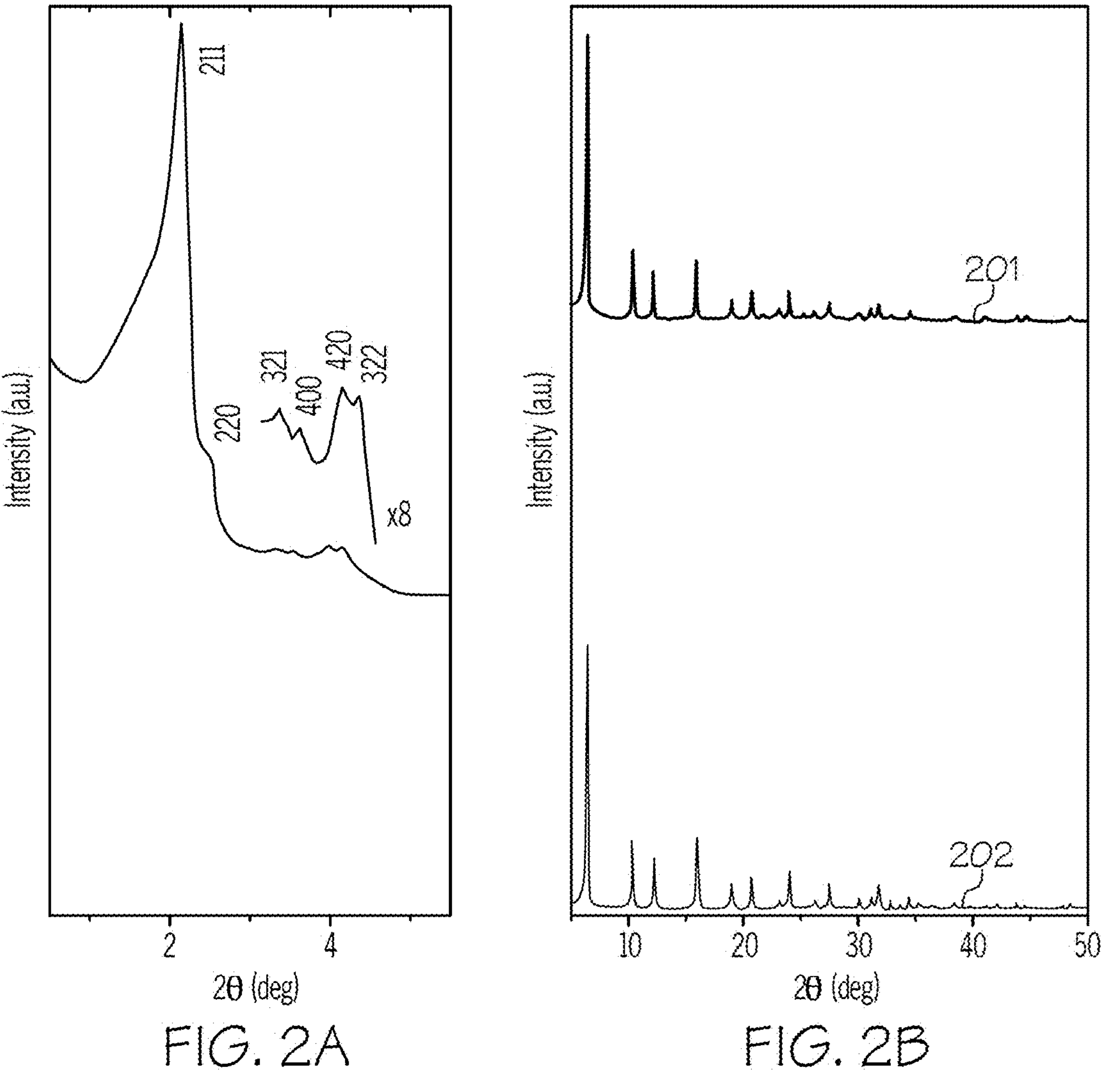
FIG. 2A depicts the low angle x-ray diffraction (XRD) pattern of the zeolite comprising mesopores ordered with cubic symmetry of Example 1.
FIG. 2B depicts a high angle XRD pattern of the zeolite comprising mesopores ordered with cubic symmetry of Example 1.

The zeolite comprising mesopores ordered with cubic symmetry of Example 1 was analyzed by powder X-ray diffraction (XRD) using a Bruker D8 twin diffractometer, operating at 40 kV and 40 mA, having Cu Kα radiation (λ=0.154 nm) and a step size of 0.02°. FIG. 2A depicts the low angle XRD pattern of the zeolite comprising mesopores ordered with cubic symmetry of Example 1. As shown in FIG. 2A, the XRD pattern exhibits reflections at 211, 220, 321, 400, 420, and 332, which are characteristic of cubic mesopore symmetry of an Ia-3d space group. In FIG. 2A, the reflections at 321, 400, 420, and 332 are shown at 8 times magnification. FIG. 2B depicts a high angle XRD pattern of the zeolite comprising mesopores ordered with cubic symmetry of Example 1 (Diffractogram 201) and a high angle XRD pattern of the zeolite Y (Diffractogram 202). The retention of the underlying zeolite structure is apparent from FIG. 2B, where the peaks of the zeolite comprising mesopores ordered with cubic symmetry of Example 1 are consistent with those of the zeolite Y.

Example 2—Dehydroxylation of the Zeolite Comprising Mesopores Ordered with Cubic Symmetry of Example 1

The zeolite comprising mesopores ordered with cubic symmetry of Example 1 was dehydroxylated at 700° C. to form a dehydroxylated zeolite. Two grams of the zeolite comprising mesopores ordered with cubic symmetry of Example 1 was added to a quartz reactor fitting a tubular furnace. The zeolite comprising mesopores ordered with cubic symmetry of Example 1 was treated at a temperature of 700° C. and a pressure of 10-5 mbar for 16 hours. The ramp rate of the furnace was 2.8° C./min. The dehydroxylation process resulted in the condensation of vicinal hydroxyl surface groups and the formation of both single silanol (≡Si—OH) and Bronsted acid (≡Si—OH→Al≡) along with siloxane bridges (≡Si—O—Si≡). The dehydroxylated zeolite of Example 2 was characterized using FT-IR and solid-state NMR spectroscopy.

Figure 3:
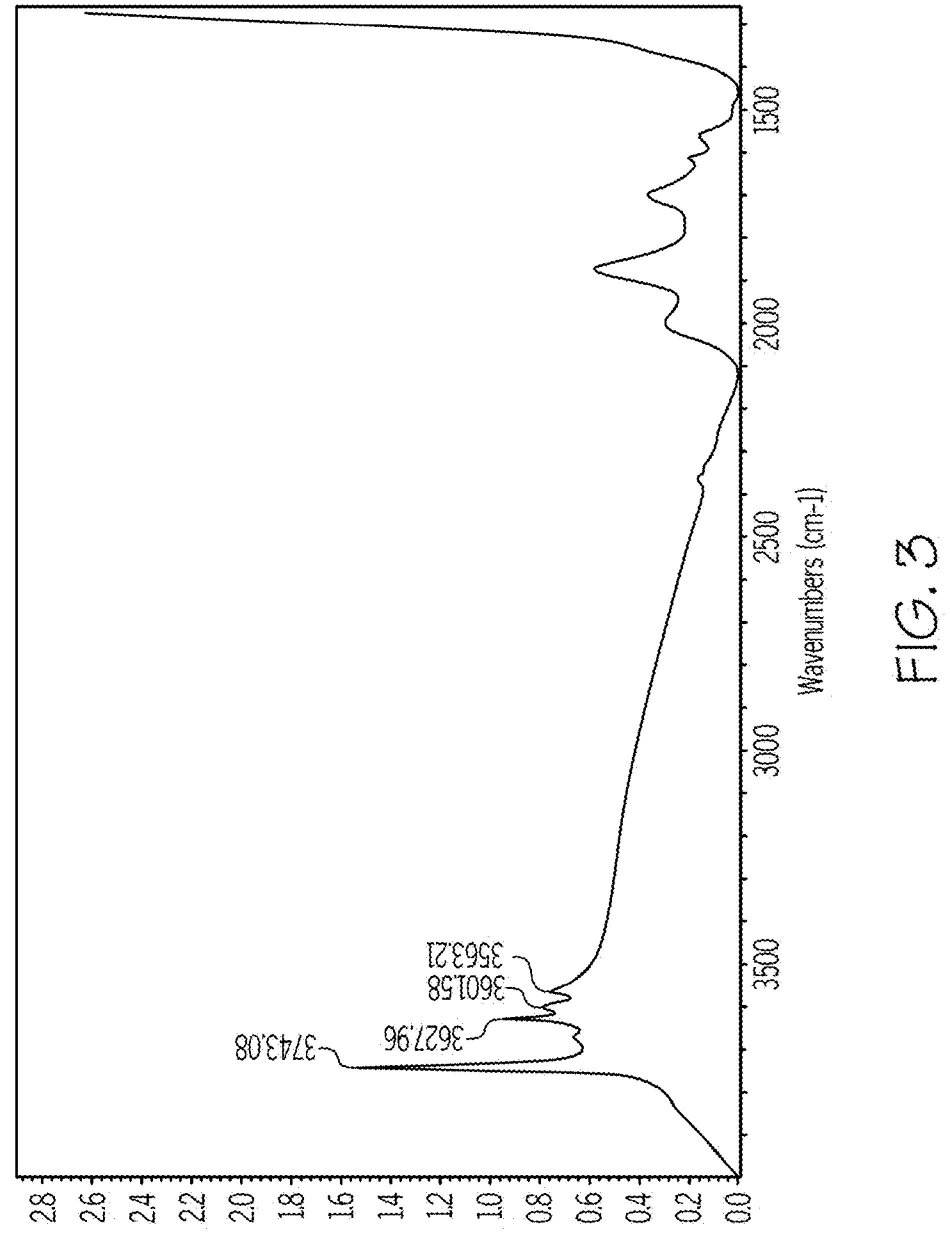
FIG. 3 depicts a Fourier-transform infrared spectroscopy (FTIR) spectrum of the dehydroxylated zeolite of Example 2.

FIG. 3 depicts the FT-IR spectrum of the dehydroxylated zeolite of Example 2. The FT-IR band corresponding to single silanols appears at 3743 $cm^{-1}$, and two intense bands at 3627 $cm^{-1}$ and 3563 $cm^{-1}$ are assigned to high frequency and low frequency OH bridging groups. The band at 3601 $cm^{-1}$ corresponds to a high frequency groups polarized by Lewis acid extraframework aluminum species. The less intense band at 3680 $cm^{-1}$ corresponds to the acid Al—O(H)—Al groups, partially connected to the framework of the dehydroxylated zeolite of Example 2.

Figure 4:
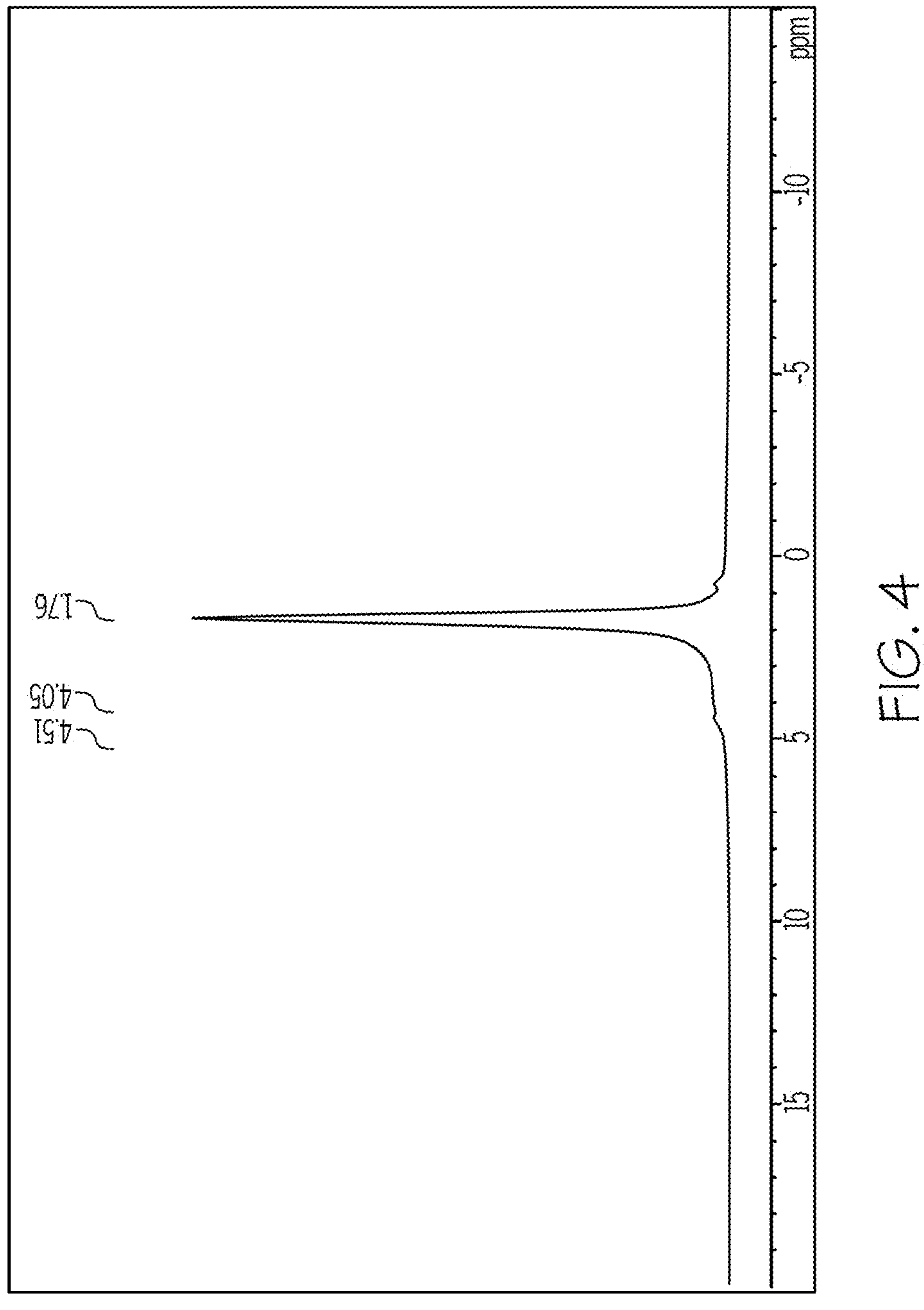
FIG. 4 depicts a $^{1}$H-MAS-NMR spectrum of the dehydroxylated zeolite of Example 2.

FIG. 4 shows the $^1$H-MAS-NMR spectrum of the dehydroxylated zeolite of Example 2. The $^1$H-MAS-NMR spectrum of the dehydroxylated zeolite of Example 2 shows a peak at 1.76 ppm for isolated silanol groups (≡Si—OH) and two peaks for Bronsted acid groups (≡Si—O(H)→Al≡) at 4.51 ppm and 4.05 ppm.

Figure 5:
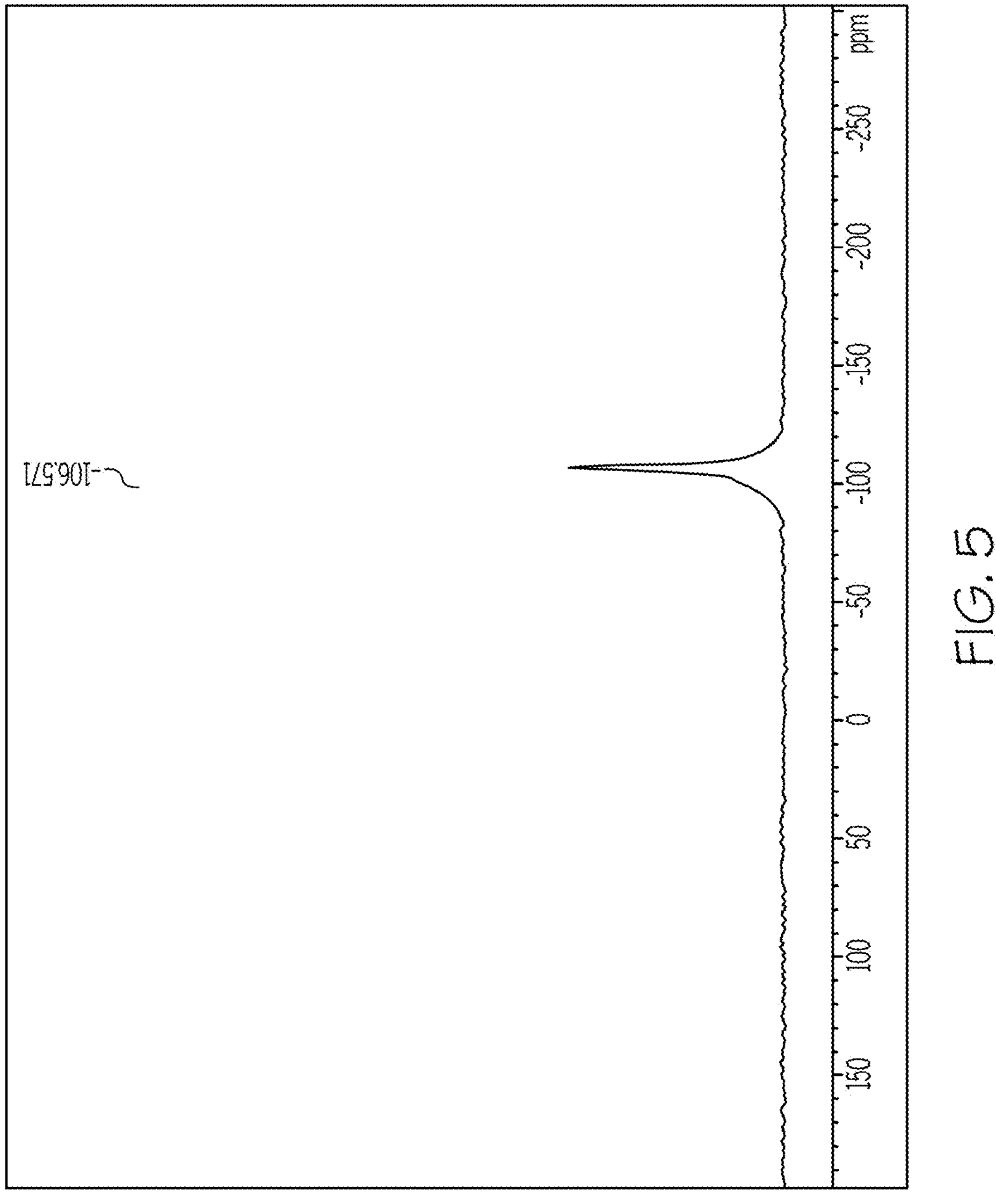
FIG. 5 depicts a 29Si-CP-MAS-NMR spectrum of the dehydroxylated zeolite of Example 2.

FIG. 5 shows the 29Si-CP-MAS-NMR spectrum of the dehydroxylated zeolite of Example 2. The 29Si-CP-MAS-NMR spectrum of the dehydroxylated zeolite of Example 2 shows a peak at −106.57 ppm corresponding to Si in tetrahedral coordination, representing a Si—O—Si network.

Figure 6:
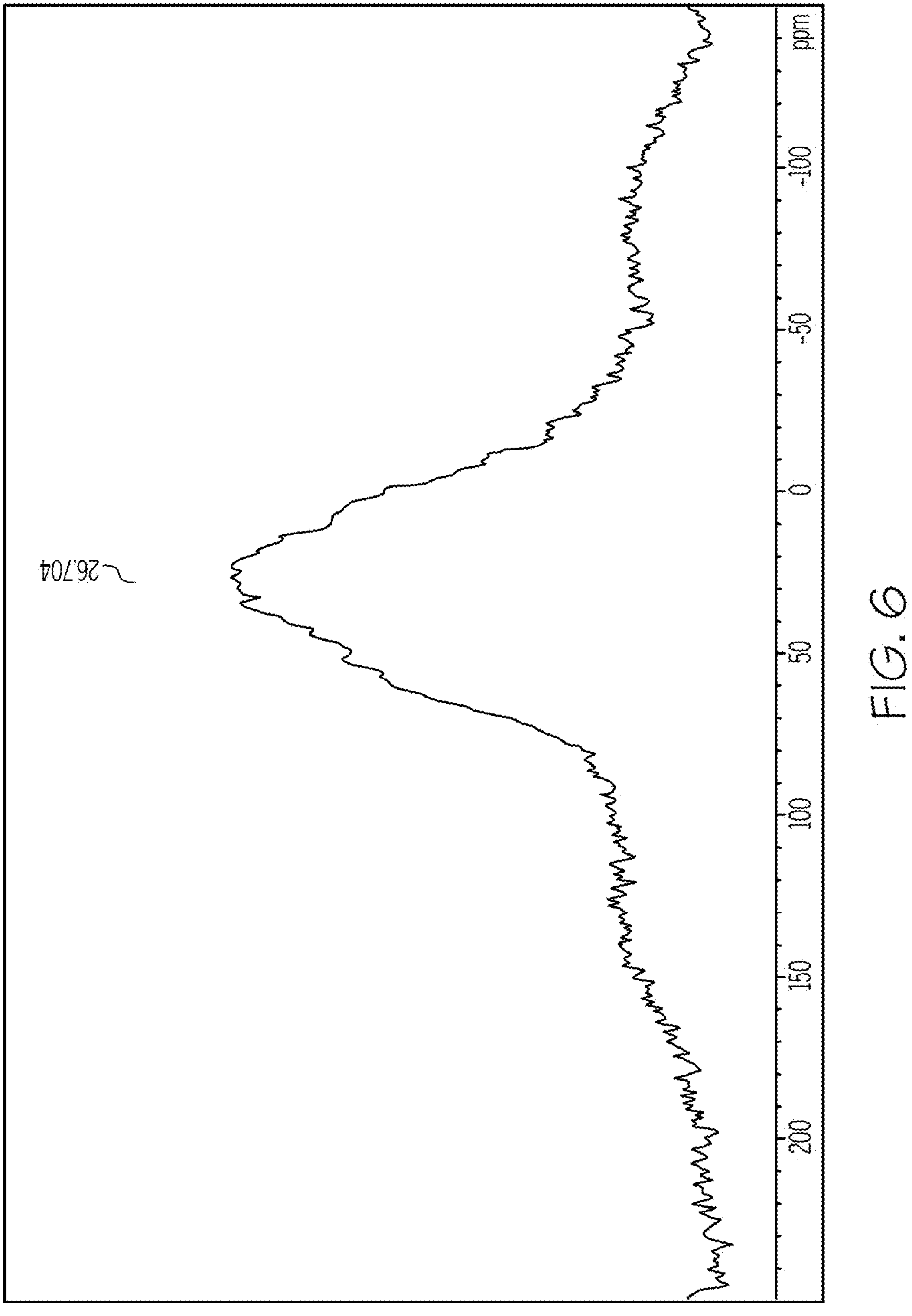
FIG. 6 depicts a $^{27}$Al-MAS-NMR spectrum of the dehydroxylated zeolite of Example 2.

FIG. 6 shows the $^{27}$Al-MAS-NMR spectrum of the dehydroxylated zeolite of Example 2. The $^{27}$Al-MAS-NMR spectrum of the dehydroxylated zeolite of Example 2 shows a broad resonance corresponding to tetra-, penta-, and octa-coordinated aluminum centers with a predominance of penta-coordinated aluminum centers (26.7 ppm).

Example 3—Formation of a Modified Zeolite

The dehydroxylated zeolite of Example 2 was reacted with ammonia to form a modified zeolite. One gram of the dehydroxylated zeolite of Example 2 was added to a quartz reactor inside a glovebox. The reactor was evacuated under high vacuum before being connected to an ammonia reactor. The reactor was filled with $N_2$ to check for leaks. Afterwards, the reactor was charged with ammonia ($NH_3$). The reactor was heated to 500° C. for 6 hours under a flow of ammonia of 300 mL/min. After 6 hours, the flow of ammonia was replaced with a flow of $N_2$ and the reactor was allowed to cool to room temperature. The reactor was evacuated under high vacuum overnight. The modified zeolite of Example 3 was analyzed using FT-IR spectroscopy and solid-state NMR spectroscopy.

Figure 7:
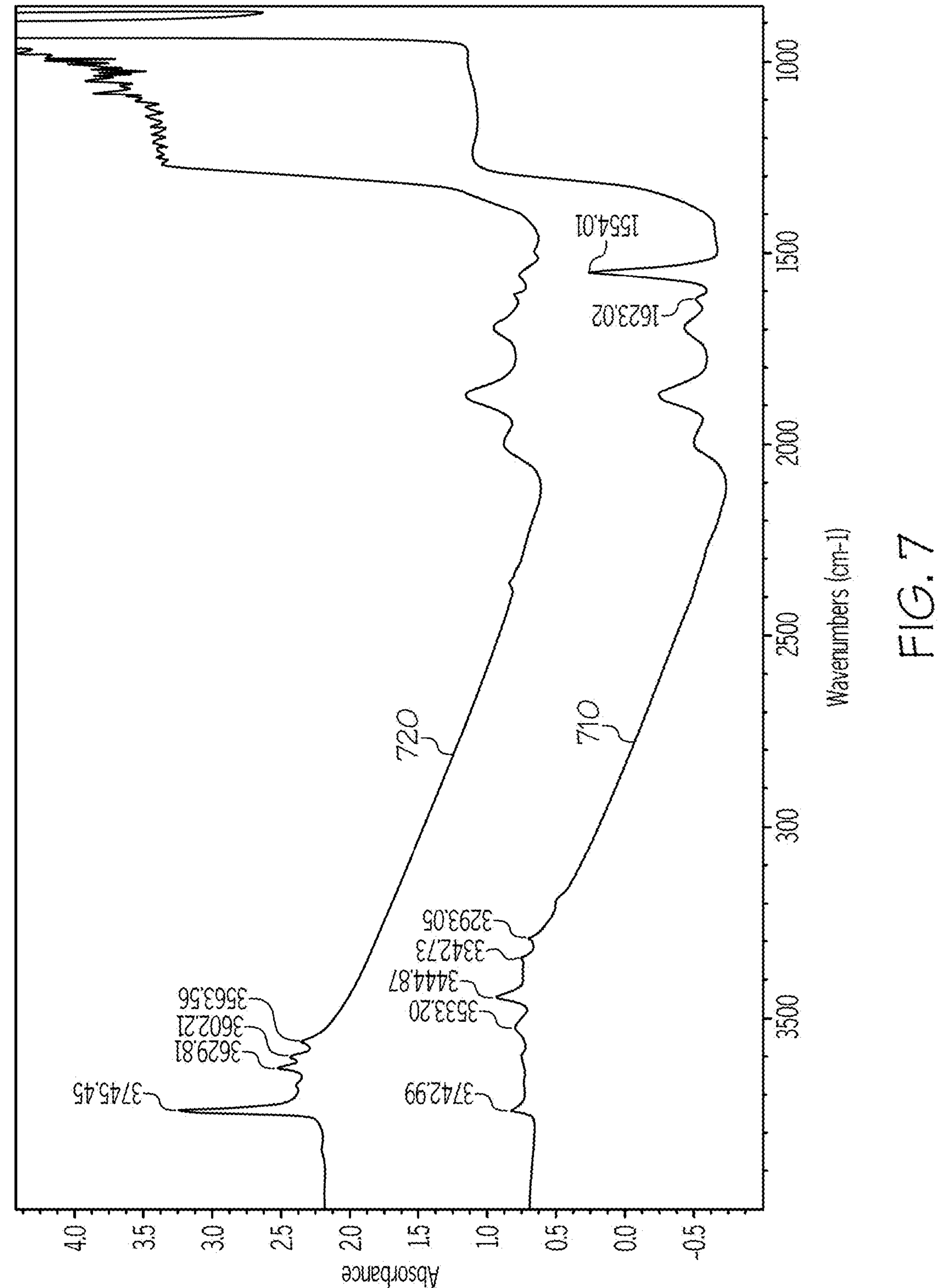
FIG. 7 depicts a FT-IR spectrum of the modified zeolite of Example 3.

FIG. 7 shows the FT-IR spectrum of the modified zeolite of Example 3, Spectrum 710, and the FT-IR spectrum of the dehydroxylated zeolite of Example 2, Spectrum 720. The FT-IR spectrum of the modified zeolite of Example 3 included six new peaks at 3533 $cm^{-1}$, 3445 $cm^{-1}$, 3343 $cm^{-1}$, 3293 $cm^{-1}$, 1623 $cm^{-1}$, and 1554 $cm^{-1}$ corresponding to $v_s$(≡Si—$NH_2$), $v_{as}$(≡Si—$NH_2$), $v_s$(≡Si—$NH_2$→Al≡), $v_{as}$(≡Si—$NH_2$→Al≡), δ(≡Si—$NH_2$→Al≡) and δ(≡Si—$NH_2$), respectively, relative to the FT-IR spectrum of the dehydroxylated zeolite of Example 2.

Figure 8:
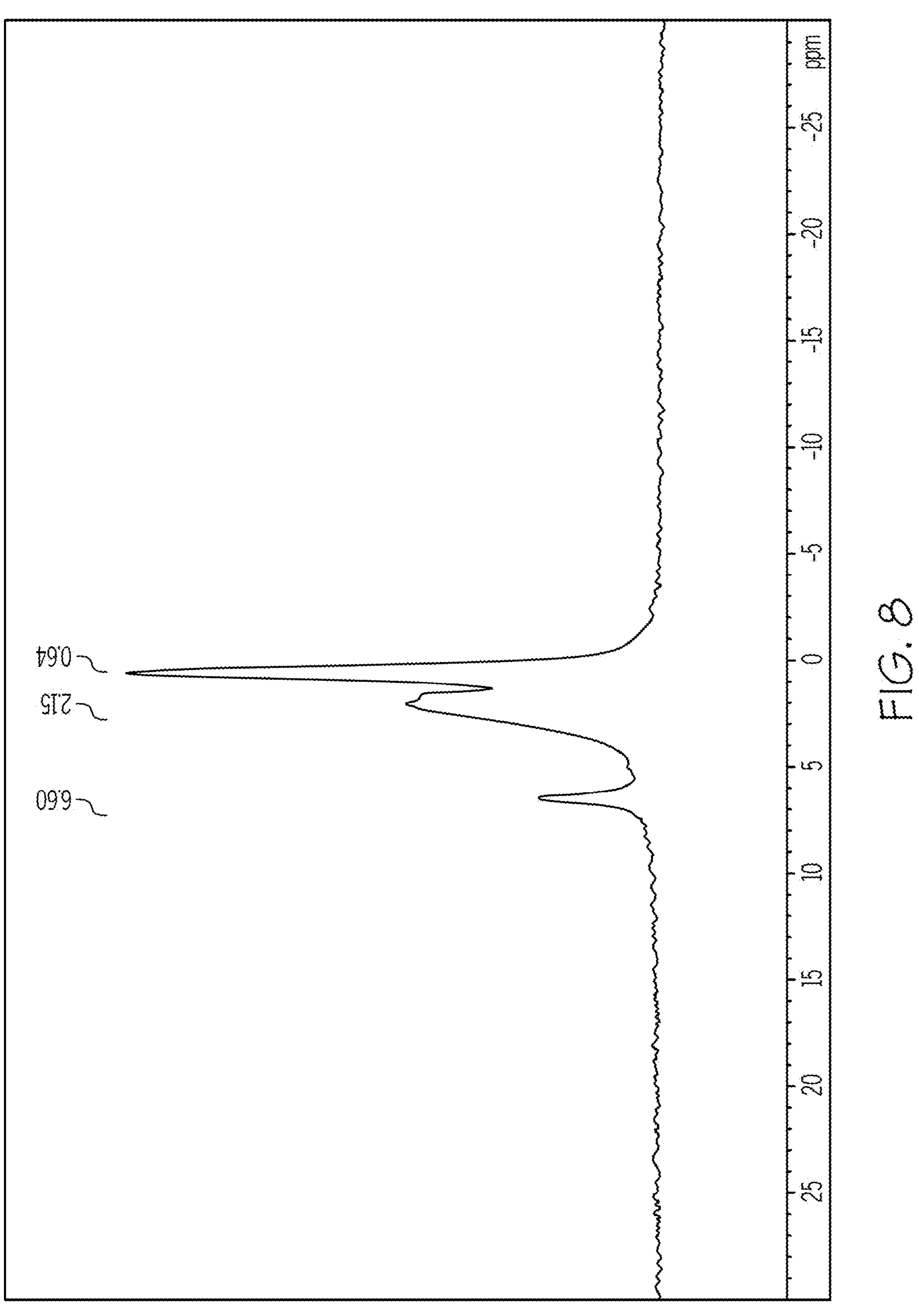
FIG. 8 depicts a $^{1}$H-MAS-NMR spectrum of the modified zeolite of Example 3.

FIG. 8 shows the $^1$H-MAS-NMR spectrum of the modified zeolite of Example 3. The $^1$H-MAS-NMR spectrum of the modified zeolite of Example 3 includes a peak at 0.64 ppm, corresponding to silylamine [≡Si$NH_2$], a peak at 2.15 ppm corresponding to silylamine coordinated with aluminum (≡Si—$NH_2$→Al≡), and a peak at 6.60 ppm corresponding to (≡Si—OH→Al≡). Multiple peaks were observed for silylamine coordinated with aluminum because of the presence of different kinds of aluminum coordination.

Figure 9:
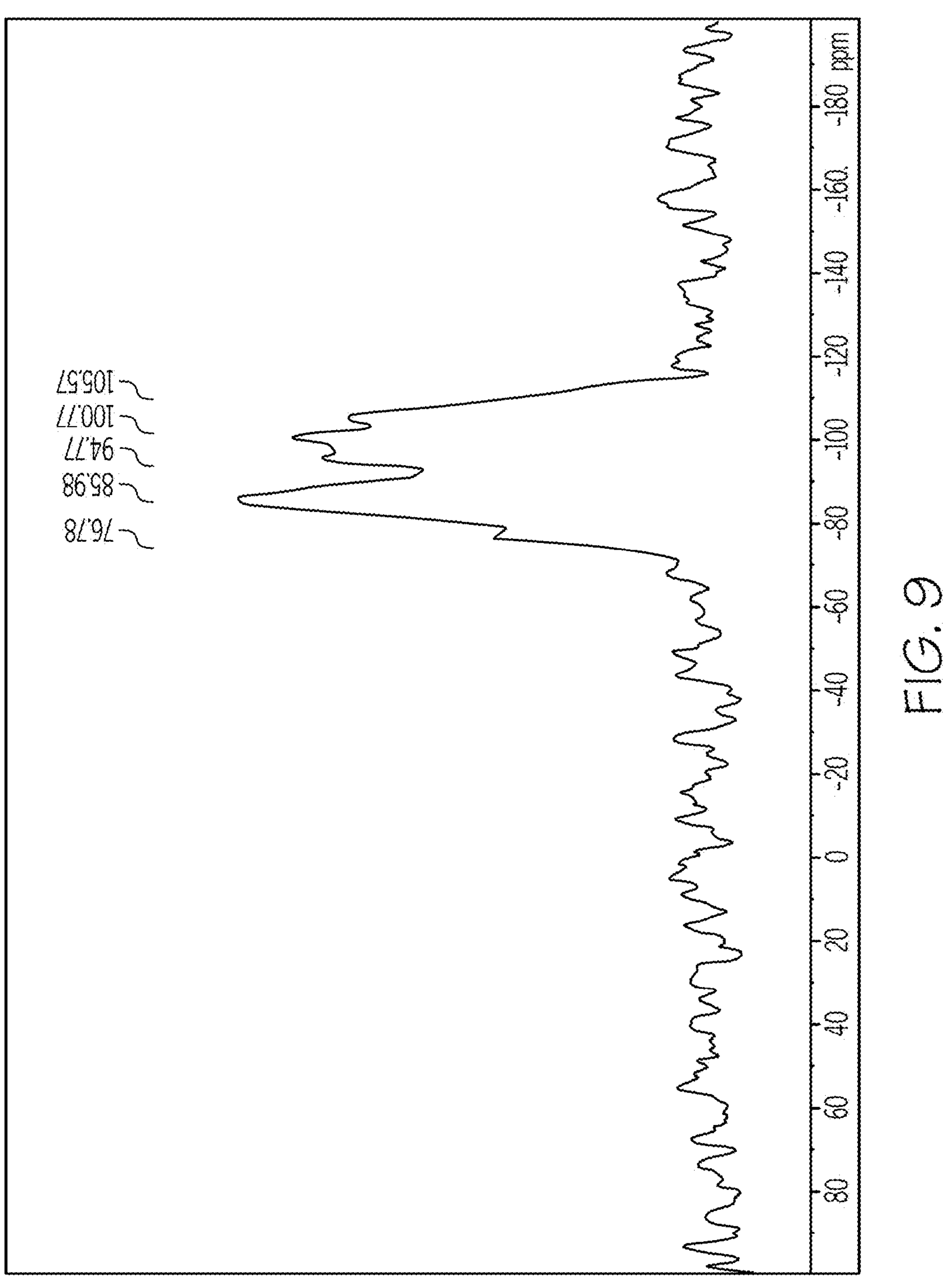
FIG. 9 depicts a 29Si-CP-MAS-NMR spectrum of the modified zeolite of Example 3.

FIG. 9 shows the 29Si-CP-MAS-NMR spectrum of the modified zeolite of Example 3. The 29Si-CP-MAS-NMR spectrum of the modified zeolite of Example 3 includes a peak at −76 ppm corresponding to $Q^2SiO_2(NH_2)_2$ (germinal silyl amines), a peak at −85 ppm corresponding to $Q^3SiO_3NH_2$ (silyl amine), a peak at −94 ppm corresponding to $Q^2SiO_2\ (OH)_2$, a peak at −100 ppm corresponding to $Q^3SiO_3$ (OH), and a peak at −105 ppm corresponding to $Q^4SiO_4$.

Figure 10:
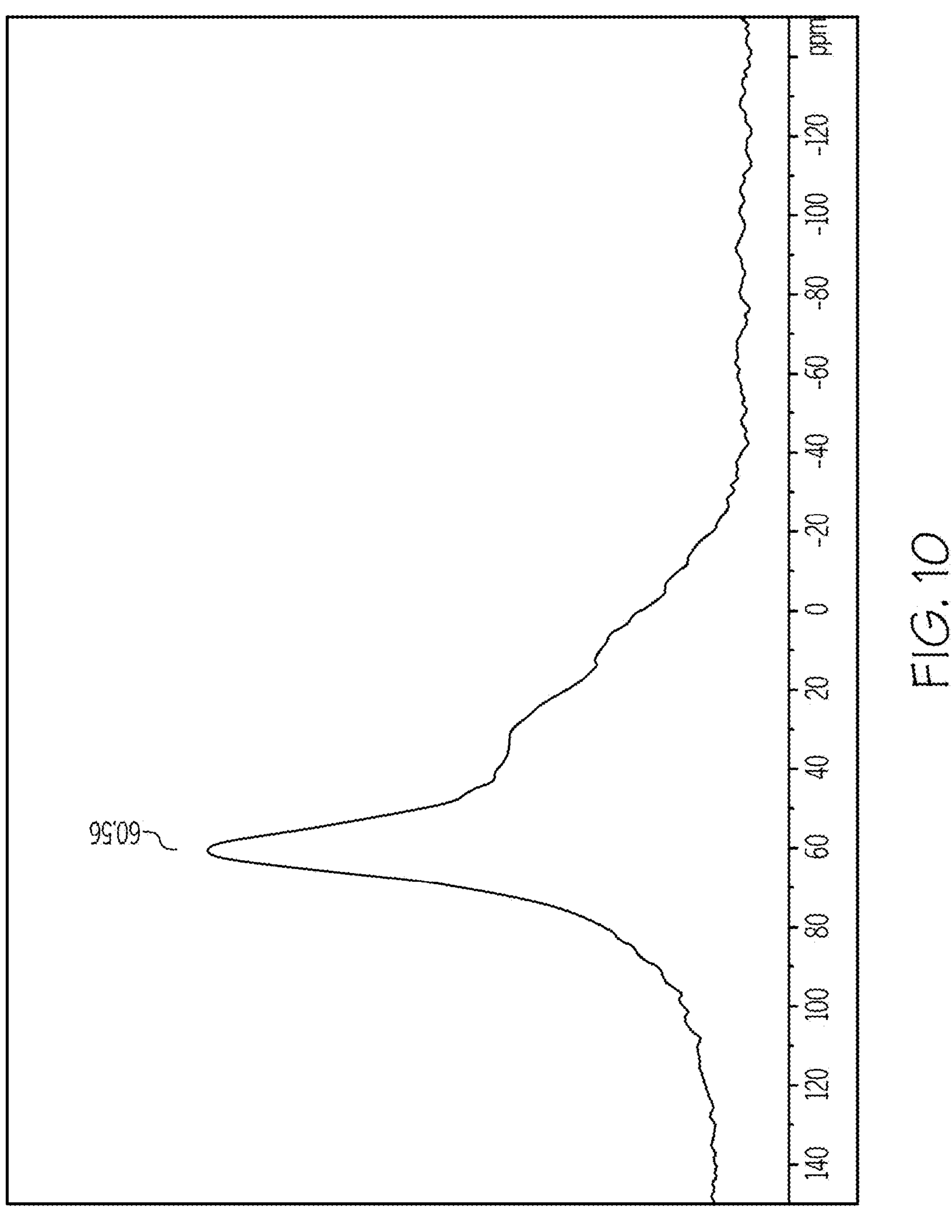
FIG. 10 depicts a $^{27}$Al-MAS-NMR spectrum of the modified zeolite of Example 3.

FIG. 10 shows the $^{27}$Al-MAS-NMR spectrum of the modified zeolite of Example 3. The $^{27}$Al-MAS-NMR spectrum of the modified zeolite of Example 3 includes a broad peak corresponding to tetra-, penta-, and octa-coordinated aluminum centers, with a predominance of tetra-coordinated aluminum centers (60 ppm).

Figure 11:
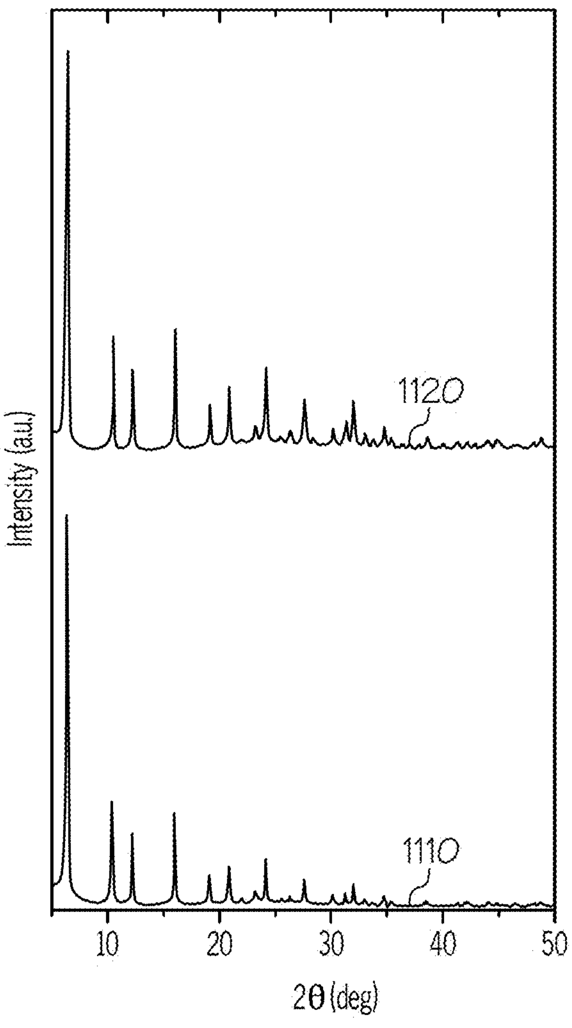
FIG. 11 depicts XRD patterns of the dehydroxylated zeolite of Example 2 and the modified zeolite of Example 3.

The crystallinity of the dehydroxylated zeolite of Example 2 and the modified zeolite of Example 3 was analyzed using powder X-ray diffraction. FIG. 11 shows the XRD patterns of the dehydroxylated zeolite of Example 2, pattern 1110, and the modified zeolite of Example 3, pattern 1120. In comparing the XRD patterns, no structural change was observed and the crystallinity of the modified zeolite of Example 3 remained intact. This is surprising because harsh ammoniation reaction conditions may lead to a loss of crystallinity. The modified zeolite of Example 3 has cubic crystal symmetry having a Fd-3m space group, which is typical of FAU frameworks. Additionally, the XRD studies of the modified zeolite of Example 3 show that the modified zeolite is stable after the ammonia treatment and does not include other impure phases.

Figure 12:
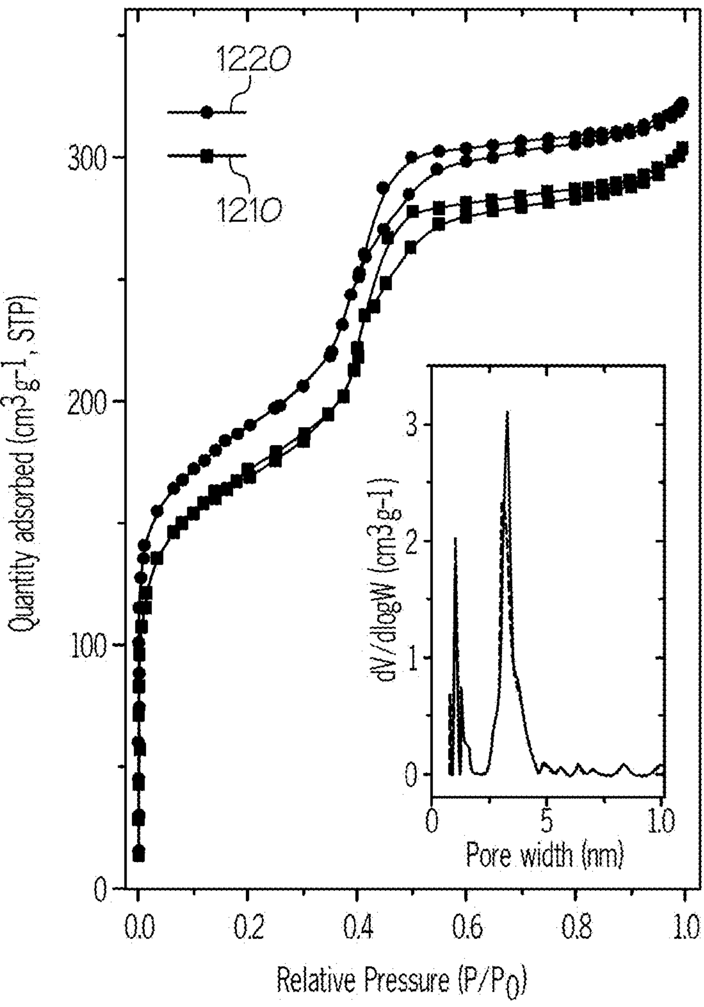
FIG. 12 depicts $N_2$ physisorption isotherms of the dehydroxylated zeolite of Example 2 and the modified zeolite of Example 3.

$N_2$ physisorption isotherms were measured for the dehydroxylated zeolite of Example 2 and the modified zeolite of Example 3. FIG. 12 shows the $N_2$ physisorption isotherm of the dehydroxylated zeolite of Example 2, isotherm 1210, and the $N_2$ physisorption isotherm of the modified zeolite of Example 3, isotherm 1220. The $N_2$ physisorption isotherms show Type I and Type IV isotherm characteristics of hierarchical pore architecture. The BET surface area, pore volume, and pore size distribution of the dehydroxylated zeolite of Example 2 and the modified zeolite of Example 3 were also measured. The insert in FIG. 12 shows the pore size distribution of the dehydroxylated zeolite of Example 2 and the pore size distribution of the modified zeolite of Example 3. Table 2 shows the BET surface area, mesopore size, and pore volume of the dehydroxylated and modified zeolites. As shown in Table 2, the BET surface area of the modified zeolite was greater than the BET surface area of the dehydroxylated zeolite. Increasing the pore volume, total surface area, and pore size of the modified zeolite may improve the contact of reactants with active sites on the modified zeolite, which in turn, may improve catalytic performance.

TABLE 2

| | BET Surface Area ($m^2\ g^{-1}$) | | Mesopore | Pore Volume ($cm^3\ g^{-1}$) | |
|---|---|---|---|---|---|
| Sample | Micro | Total | Size (nm) | Micro | Total |
| Dehydroxylated Zeolite (Example 2) | 247 | 603 | 3.1 | 0.11 | 0.47 |
| Modified Zeolite (Example 3) | 262 | 676 | 3.3 | 0.11 | 0.49 |

Figure 13:
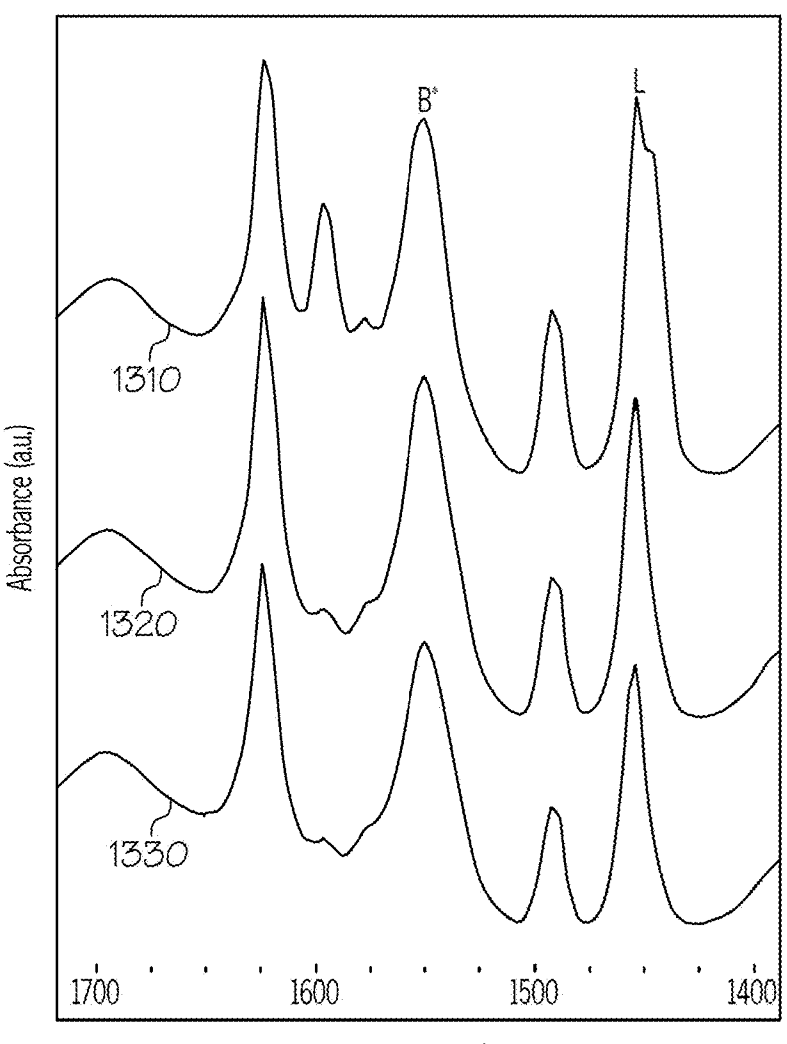
FIG. 13 depicts pyridine FT-IR spectra of the modified zeolite of Example 3.

FIG. 13 depicts the pyridine FT-IR spectra of the modified zeolite of Example 3 at three temperatures. Spectrum 1310 is the FT-IR spectrum of the modified zeolite of Example 3 at 150° C., spectrum 1320 is the FT-IR spectrum of the modified zeolite of Example 3 at 250° C., and spectrum 1330 is the FT-IR spectrum of the modified zeolite of Example 3 at 350° C. The peak corresponding to Bronsted acidity is at 1545 $cm^{-1}$, which is marked with a "B*," and the peak corresponding to Lewis acidity is at 1455 $cm^{-1}$, which is marked with an "L." It should be noted that the peak for Bronsted acidity, labeled "B*" in FIG. 13, is a signal that overlaps with the signal for silyl amine (Si—$NH_2$). The total concentration of acid sites was quantified and the values are included in Table 3.

TABLE 3

| Temperature | Total Acidity (μmol/g) | Lewis (1455 $cm^{-1}$) (μmol/g) | Bronsted (1545 $cm^{-1}$) (μmol/g) |
|---|---|---|---|
| 150° C. | 196.8 | 174.6 | 22.1 |
| 250° C. | 107.6 | 92.8 | 14.8 |
| 350° C. | 65.4 | 56.3 | 9.1 |

The acid properties of the zeolite comprising mesopores ordered with cubic symmetry of Example 1 and the dehydroxylated zeolite of Example 2 were also measured by pyridine FT-IR spectroscopy at a temperature of 150° C. The acid properties of the zeolite comprising mesopores ordered with cubic symmetry of Example 1 are included in Table 4. The acid properties of the dehydroxylated zeolite of Example 2 are included in Table 5. The modified zeolite of Example 3 had a slightly greater total acidity than the dehydroxylated zeolite of Example 2, as shown in Tables 3 and 5. The acidity of the modified zeolite may be tuned to adjust the catalytic properties of the modified zeolite.

TABLE 4

| Temperature | Total Acidity (μmol/g) | Lewis (1455 $cm^{-1}$) (μmol/g) | Bronsted (1545 $cm^{-1}$) (μmol/g) |
|---|---|---|---|
| 150° C. | 204.7 | 77.1 | 127.6 |

TABLE 5

| Temperature | Total Acidity (μmol/g) | Lewis (1455 $cm^{-1}$) (μmol/g) | Bronsted (1545 $cm^{-1}$) (μmol/g) |
|---|---|---|---|
| 150° C. | 140 | 60 | 80 |

Figure 14B:
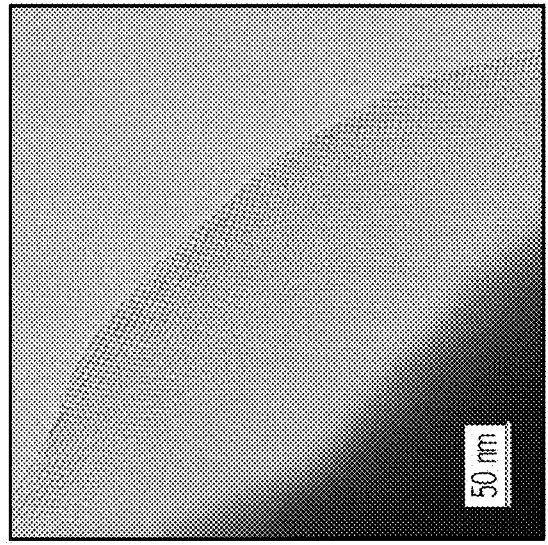
FIG. 14B depicts a TEM micrograph of the dehydroxylated zeolite of Example 2.
Figure 14A:
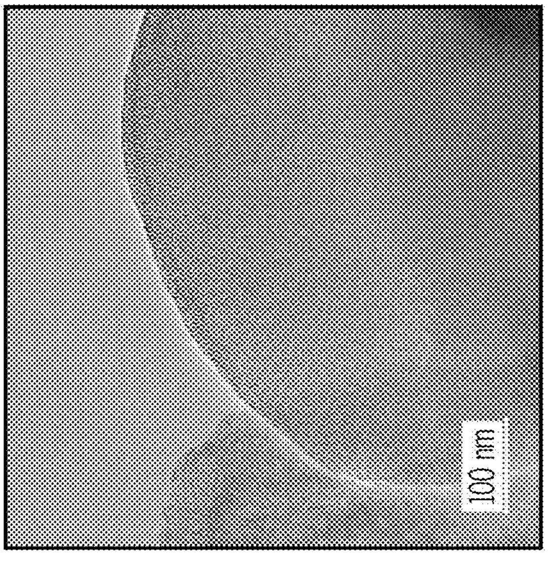
FIG. 14A depicts a TEM micrograph of the dehydroxylated zeolite of Example 2.
Figure 15B:
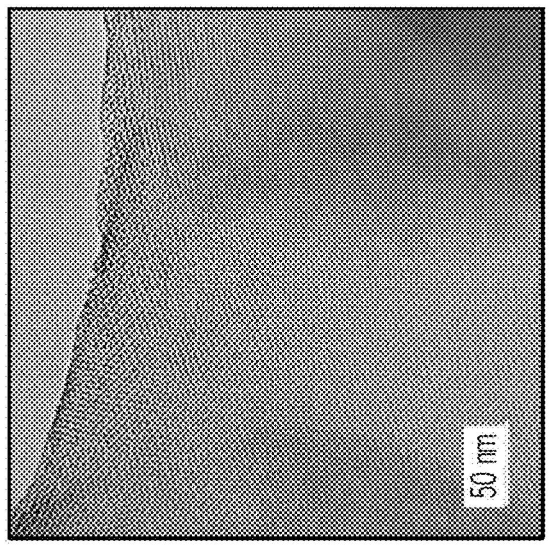
FIG. 15B depicts a TEM micrograph of the modified zeolite of Example 3.
Figure 15A:
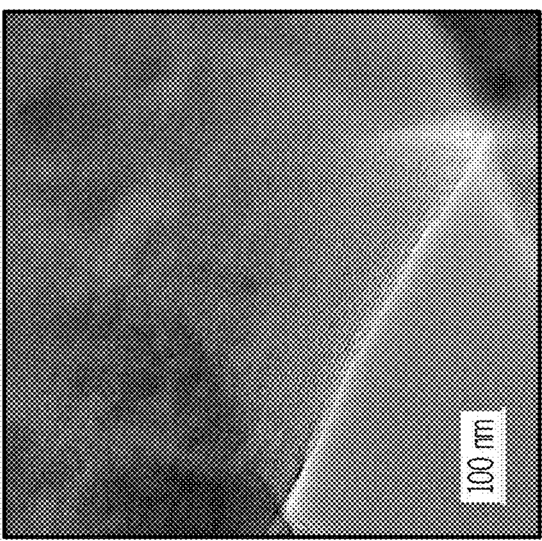
FIG. 15A depicts a TEM micrograph of the modified zeolite of Example 3.

TEM micrographs of the dehydroxylated zeolite of Example 2 are depicted in FIGS. 14A and 14B, and TEM micrographs of the modified zeolite of Example 3 are depicted in FIGS. 15A and 15B. As shown in FIGS. 14A-B and 15A-B, the crystal structure and ordered mesopore structure of the dehydroxylated zeolite of Example 2 was retained in the modified zeolite of Example 3 after the amine-modification treatment.

In a first aspect of the present disclosure, a modified zeolite comprises a microporous framework comprising a plurality of micropores having diameters of less than or equal to 2 nm, wherein the microporous framework comprises at least silicon atoms and oxygen atoms; a plurality of mesopores having diameters of greater than 2 nm and less than or equal to 50 nm, wherein the plurality of mesopores are ordered with cubic symmetry; wherein the modified zeolite comprises: isolated terminal primary amine functionalities bonded to silicon atoms of the microporous framework; or silazane functionalities wherein the nitrogen atom of the silazane bridges two silicon atoms of the microporous framework; or both.

A second aspect of the present disclosure may include the first aspect, wherein the modified zeolite comprises Lewis acid moieties and Bronsted acid moieties and a ratio of Lewis acid moieties to Bronsted acid moieties is from 6.2 to 7.9.

A third aspect of the present disclosure may include either the first or second aspect, wherein a total acidity of the modified zeolite is from 100 μmol/g to 250 μmol/g.

A fourth aspect of the present disclosure may include any of the first through third aspects, wherein the modified zeolite comprises the isolated terminal primary amine functionalities bonded to silicon atoms of the microporous framework.

A fifth aspect of the present disclosure may include the fourth aspect, wherein the modified zeolite comprises from 0.5 mmol/g to 3.0 mmol/g isolated terminal primary amine functionalities.

A sixth aspect of the present disclosure may include any of the first through fifth aspects, wherein the modified zeolite comprises the silazane functionalities wherein the nitrogen atom of the silazane bridges two silicon atoms of the microporous framework.

A seventh aspect of the present disclosure may include the sixth aspect, wherein the modified zeolite comprises from 1.5 mmol/g to 3.0 mmol/g silazane functionalities.

An eighth aspect of the present disclosure may include any of the first through seventh aspects, wherein the modified zeolite comprises both (a) the isolated terminal primary amine functionalities bonded to silicon atoms of the microporous framework, and (b) the modified zeolite comprises the silazane functionalities wherein the nitrogen atom of the silazane bridges two silicon atoms of the microporous framework.

A ninth aspect of the present disclosure may include any of the first through eighth aspects, wherein a surface area of the modified zeolite is from 200 $m^2/g$ to 1500 $m^2/g$.

A tenth aspect of the present disclosure may include any of the first through ninth aspects, wherein a pore volume of the modified zeolite is from 0.01 $cm^3/g$ to 1.5 $cm^3/g$.

An eleventh aspect of the present disclosure may include any of the first through tenth aspects, wherein the mesopores are ordered with cubic symmetry having an Ia-3d, Fm-3m, Pm-3n, Pn-3m, Im-3m, or Fd-3m space group.

A twelfth aspect of the present disclosure may include any of the first through eleventh aspects, wherein the modified zeolite is an FAU framework type zeolite.

A thirteenth aspect of the present disclosure may include any of the first through twelfth aspects, wherein the modified zeolite is an USY zeolite.

A fourteenth aspect of the present disclosure may include any of the first through thirteenth aspects, wherein the microporous framework further comprises aluminum atoms and a ratio of silicon atoms to aluminum atoms is from 1.5 to 1500.

In a fifteenth aspect of the present disclosure, a method for processing a hydrocarbon feedstock comprises contacting the hydrocarbon feedstock with a modified zeolite to form a product, wherein the modified zeolite comprises: a microporous framework comprising a plurality of micropores having diameters of less than or equal to 2 nm, wherein the microporous framework comprises at least silicon atoms and oxygen atoms; a plurality of mesopores having diameters of greater than 2 nm and less than or equal to 50 nm, wherein the plurality of mesopores are ordered with cubic symmetry; and wherein the modified zeolite comprises: isolated terminal primary amine functionalities bonded to silicon atoms of the microporous framework; or silazane functionalities wherein the nitrogen atom of the silazane bridges two silicon atoms of the microporous framework; or both.

In a sixteenth aspect of the present disclosure, a method of making a modified zeolite comprises: contacting a dehydroxylated zeolite with ammonia, wherein the dehydroxylated zeolite comprises: a microporous framework comprising a plurality of micropores having diameters of less than or equal to 2 nm, wherein the microporous framework comprises at least silicon atoms and oxygen atoms; a plurality of mesopores having diameters of greater than 2 nm and less than or equal to 50 nm, wherein the plurality of mesopores are ordered with cubic symmetry; and isolated terminal silanol functionalities comprising hydroxyl groups bonded to silicon atoms of the microporous framework; wherein contacting the dehydroxylated zeolite with the ammonia forms the modified zeolite.

A seventeenth aspect of the present disclosure may include the sixteenth aspect, wherein the method further comprises dehydroxylating an initial zeolite to from the dehydroxylated zeolite, wherein the initial zeolite primarily comprises vicinal silanol functionalities, and wherein dehydroxylating the initial zeolite forms the isolated terminal silanol functionalities.

An eighteenth aspect of the present disclosure may include the seventeenth aspect, wherein the dehydroxylation temperature is 800° C. or less; the contacting of the dehydroxylated zeolite with ammonia is at a temperature of less than 800° C.; and the modified zeolite comprises isolated terminal primary amine functionalities bonded to silicon atoms of the microporous framework.

A nineteenth aspect of the present disclosure may include the seventeenth aspect, wherein the dehydroxylation temperature is 800° C. or greater; the contacting of the dehydroxylated zeolite with ammonia is at a temperature of 600° C. or greater; and the modified zeolite comprises silazane functionalities wherein the nitrogen atom of the silazane bridges two silicon atoms of the microporous framework.

A twentieth aspect of the present disclosure may include the seventeenth aspect, wherein the dehydroxylation temperature is from 650° C. to 1100° C., and wherein the contacting of the dehydroxylated zeolite with ammonia is at a temperature of less than 900° C.

The subject matter of the present disclosure has been described in detail and by reference to specific embodiments. It should be understood that any detailed description of a feature of an embodiment does not necessarily imply that the feature is essential to the particular embodiment or to any other embodiment. Further, it should be apparent to those skilled in the art that various modifications and variations can be made to the described embodiments without departing from the spirit and scope of the claimed subject matter.

For the purposes of describing and defining the present disclosure it is noted that the terms "about" or "approximately" are utilized in this disclosure to represent the inherent degree of uncertainty that may be attributed to any quantitative comparison, value, measurement, or other representation. The terms "about" and/or "approximately" are also utilized in this disclosure to represent the degree by which a quantitative representation may vary from a stated reference without resulting in a change in the basic function of the subject matter at issue.

It should be understood that any two quantitative values assigned to a property may constitute a range of that property, and all combinations of ranges formed from all stated quantitative values of a given property are contemplated in this disclosure.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." It should be understood that where a first component is described as "comprising" a second component, it is contemplated that, in some embodiments, the first component "consists" or "consists essentially of" that second component. The transitional phrase "consisting of" excludes any element, step, or ingredient not specified in the claim, and the transitional phrase "consisting essentially of" is a limitation to the specified materials or steps and those that do not materially affect the basic and novel characteristics of the claimed embodiment.

What is claimed is:

1. A modified zeolite comprising:

a microporous framework comprising a plurality of micropores having diameters of less than or equal to 2 nm, wherein the microporous framework comprises at least silicon atoms and oxygen atoms;

a plurality of mesopores having diameters of greater than 2 nm and less than or equal to 50 nm, wherein the plurality of mesopores are ordered with cubic symmetry; and wherein the modified zeolite comprises:

isolated terminal primary amine functionalities bonded to silicon atoms of the microporous framework; or silazane functionalities wherein the nitrogen atom of the silazane bridges two silicon atoms of the microporous framework; or both;

wherein the microporous framework is a silica framework, an aluminosilicate framework, or a titanosilicate framework; and wherein the modified zeolite is an FAU framework type zeolite.

2. The modified zeolite of claim 1, wherein the modified zeolite comprises Lewis acid moieties and Bronsted acid moieties and a ratio of Lewis acid moieties to Bronsted acid moieties is from 6.2 to 7.9.

3. The modified zeolite of claim 1, wherein a total acidity of the modified zeolite is from 100 μmol/g to 250 μmol/g.

4. The modified zeolite of claim 1, wherein the modified zeolite comprises the isolated terminal primary amine functionalities bonded to silicon atoms of the microporous framework.

5. The modified zeolite of claim 4, wherein the modified zeolite comprises from 0.5 mmol/g to 3.0 mmol/g isolated terminal primary amine functionalities.

6. The modified zeolite of claim 1, wherein the modified zeolite comprises the silazane functionalities wherein the nitrogen atom of the silazane bridges two silicon atoms of the microporous framework.

7. The modified zeolite of claim 6, wherein the modified zeolite comprises from 1.5 mmol/g to 3.0 mmol/g silazane functionalities.

8. The modified zeolite of claim 1, wherein the modified zeolite comprises both (a) the isolated terminal primary amine functionalities bonded to silicon atoms of the microporous framework, and (b) the modified zeolite comprises the silazane functionalities wherein the nitrogen atom of the silazane bridges two silicon atoms of the microporous framework.

9. The modified zeolite of claim 1, wherein a surface area of the modified zeolite is from 200 $m^2/g$ to 1500 $m^2/g$.

10. The modified zeolite of claim 1, wherein a pore volume of the modified zeolite is from 0.01 $cm^3/g$ to 1.5 $cm^3/g$.

11. The modified zeolite of claim 1, wherein the mesopores are ordered with cubic symmetry having an Ia-3d, Fm-3m, Pm-3n, Pn-3m, Im-3m, or Fd-3m space group.

12. The modified zeolite of claim 1, wherein the modified zeolite is an USY zeolite.

13. The modified zeolite of claim 1, wherein the microporous framework further comprises aluminum atoms and a ratio of silicon atoms to aluminum atoms is from 1.5 to 1500.

14. A method of processing a hydrocarbon feedstock, the method comprising contacting the hydrocarbon feedstock with a modified zeolite to form a product, wherein the modified zeolite comprises:

a microporous framework comprising a plurality of micropores having diameters of less than or equal to 2 nm, wherein the microporous framework comprises at least silicon atoms and oxygen atoms;

a plurality of mesopores having diameters of greater than 2 nm and less than or equal to 50 nm, wherein the plurality of mesopores are ordered with cubic symmetry; and wherein the microporous framework is a silica framework, an aluminosilicate framework, or a titanosilicate framework;

wherein the modified zeolite comprises:

isolated terminal primary amine functionalities bonded to silicon atoms of the microporous framework; or silazane functionalities wherein the nitrogen atom of the silazane bridges two silicon atoms of the microporous framework; or both; and wherein the modified zeolite is an FAU framework type zeolite.

15. A method of making a modified zeolite, the method comprising:

contacting a dehydroxylated zeolite with ammonia, wherein the dehydroxylated zeolite comprises:

a microporous framework comprising a plurality of micropores having diameters of less than or equal to 2 nm, wherein the microporous framework comprises at least silicon atoms and oxygen atoms;

a plurality of mesopores having diameters of greater than 2 nm and less than or equal to 50 nm, wherein the plurality of mesopores are ordered with cubic symmetry; and isolated terminal silanol functionalities comprising hydroxyl groups bonded to silicon atoms of the microporous framework;

wherein contacting the dehydroxylated zeolite with the ammonia forms the modified zeolite;

wherein the microporous framework is a silica framework, an aluminosilicate framework, or a titanosilicate framework; and wherein the modified zeolite is an FAU framework type zeolite.

16. The method of claim 15, further comprising dehydroxylating an initial zeolite to from the dehydroxylated zeolite, wherein the initial zeolite primarily comprises vicinal silanol functionalities, and wherein dehydroxylating the initial zeolite forms the isolated terminal silanol functionalities.

17. The method of claim 16, wherein:

dehydroxylating the initial zeolite comprises heating the initial zeolite at a temperature of 800° C. or less;

the contacting of the dehydroxylated zeolite with ammonia is at a temperature of less than 800° C.; and the modified zeolite comprises isolated terminal primary amine functionalities bonded to silicon atoms of the microporous framework.

18. The method of claim 16, wherein:

dehydroxylating the initial zeolite comprises heating the initial zeolite at a temperature of 800° C. or greater;

the contacting of the dehydroxylated zeolite with ammonia is at a temperature of 600° C. or greater; and the modified zeolite comprises silazane functionalities wherein the nitrogen atom of the silazane bridges two silicon atoms of the microporous framework.

19. The method of claim 16, wherein the dehydroxylating the initial zeolite comprises heating the initial zeolite at a temperature from 650° C. to 1100° C., and wherein the contacting of the dehydroxylated zeolite with ammonia is at a temperature of less than 900° C.

* * * * *